United States Patent
Tomsula et al.

(10) Patent No.: US 11,377,602 B2
(45) Date of Patent: Jul. 5, 2022

(54) STAGED FLUID CATALYTIC CRACKING PROCESSES INCORPORATING A SOLIDS SEPARATION DEVICE FOR UPGRADING NAPHTHA RANGE MATERIAL

(71) Applicant: LUMMUS TECHNOLOGY LLC, Bloomfield, NJ (US)

(72) Inventors: Bryan Tomsula, Houston, TX (US); Liang Chen, Houston, TX (US); Peter Loezos, Houston, TX (US); Rama Rao Marri, Bloomfield, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 163 days.

(21) Appl. No.: 16/838,506

(22) Filed: Apr. 2, 2020

(65) Prior Publication Data
US 2020/0318019 A1 Oct. 8, 2020

Related U.S. Application Data

(60) Provisional application No. 62/828,836, filed on Apr. 3, 2019.

(51) Int. Cl.
*C10G 61/02* (2006.01)
*B01J 8/18* (2006.01)
(Continued)

(52) U.S. Cl.
CPC ............ *C10G 61/02* (2013.01); *B01J 8/1827* (2013.01); *B01J 8/1845* (2013.01); *B01J 8/26* (2013.01);
(Continued)

(58) Field of Classification Search
CPC ............ C10G 61/02; C10G 2300/1044; C10G 2300/4006; C10G 2300/70; B01J 8/1827;
(Continued)

(56) References Cited

U.S. PATENT DOCUMENTS

| 5,009,769 A | * | 4/1991 | Goelzer | ............... C10G 11/18 208/113 |
| 5,043,522 A |  | 8/1991 | Leyshon et al. | |

(Continued)

FOREIGN PATENT DOCUMENTS

WO    2010/067379 A2    6/2010

OTHER PUBLICATIONS

International Search Report issued in PCT/US2020/026332 dated Jul. 27, 2020 (4 pages).

*Primary Examiner* — Randy Boyer
*Assistant Examiner* — Juan C Valencia
(74) *Attorney, Agent, or Firm* — Osha Bergman Watanabe & Burton LLP

(57) ABSTRACT

Processes and systems for the conversion of hydrocarbons herein may include separating an effluent from a moving bed reactor, the effluent including reaction product, first particulate catalyst, and second particulate catalyst. The separating may recover a first stream including the reaction product and first particulate catalyst and a second stream including second particulate catalyst. The second stream may be admixed with a regenerated catalyst stream including both first and second particulate catalyst at an elevated temperature. The admixing may produce a mixed catalyst at a relatively uniform temperature less than the elevated regenerated catalyst temperature, where the temperature is more advantageous for contacting light naphtha and heavy naphtha within the moving bed reactor to produce the effluent including the reaction product, the first particulate catalyst, and the second particulate catalyst.

26 Claims, 11 Drawing Sheets

(51) Int. Cl.
*B01J 8/26* (2006.01)
*B03B 5/32* (2006.01)

(52) U.S. Cl.
CPC .......... *B01J 2208/0084* (2013.01); *B01J 2208/00752* (2013.01); *B01J 2208/00761* (2013.01); *B01J 2208/00938* (2013.01); *B03B 5/32* (2013.01); *C10G 2300/1044* (2013.01); *C10G 2300/4006* (2013.01); *C10G 2300/70* (2013.01)

(58) Field of Classification Search
CPC .. B01J 8/1845; B01J 8/26; B01J 2208/00752; B01J 2208/00761; B01J 2208/0084; B01J 2208/00938; B01J 8/0025; B01J 8/0055; B01J 8/0095; B01J 8/087; B01J 8/18; B01J 8/1818; B01J 8/1863; B03B 5/32; B01D 45/02
See application file for complete search history.

(56) References Cited

U.S. PATENT DOCUMENTS

| | | |
|---|---|---|
| 5,053,204 A * | 10/1991 | Herbst .......... C10G 11/18 422/213 |
| 5,154,818 A | 10/1992 | Harandi et al. |
| 5,314,610 A | 5/1994 | Gartside |
| 5,534,135 A | 7/1996 | Dai et al. |
| 5,637,207 A | 6/1997 | Hsing et al. |
| 5,702,589 A | 12/1997 | Tsang et al. |
| 5,846,402 A | 12/1998 | Mandal et al. |
| 5,944,982 A | 8/1999 | Lomas |
| 5,972,205 A | 10/1999 | Tsang et al. |
| 6,106,697 A | 8/2000 | Swan et al. |
| 6,358,486 B1 | 3/2002 | Shan et al. |
| 6,809,055 B2 | 10/2004 | Overbeek et al. |
| 6,869,521 B2 | 3/2005 | Lomas |
| 6,930,219 B2 | 8/2005 | Shan et al. |
| 7,029,571 B1 | 4/2006 | Bhattacharyya et al. |
| 7,087,155 B1 | 8/2006 | Dath et al. |
| 7,128,827 B2 | 10/2006 | Tallman et al. |
| 7,179,427 B2 | 2/2007 | Marchant et al. |
| 7,268,265 B1 | 9/2007 | Stewart et al. |
| 7,314,963 B2 | 1/2008 | Voskoboynikov et al. |
| 7,323,099 B2 | 1/2008 | Henry |
| 7,375,257 B2 | 5/2008 | Dath et al. |
| 7,479,218 B2 | 1/2009 | Letzsch |
| 7,611,622 B2 | 11/2009 | Niccum et al. |
| 7,658,837 B2 | 2/2010 | Soares Cerqueira et al. |
| 9,452,404 B2 | 9/2016 | Marri et al. |
| 2006/0231461 A1 | 10/2006 | Mo et al. |
| 2007/0205139 A1 | 9/2007 | Kulprathipanja et al. |
| 2008/0156696 A1 | 7/2008 | Niccum et al. |
| 2014/0014555 A1 | 1/2014 | Marri et al. |
| 2018/0079973 A1* | 3/2018 | Chen .......... C10G 51/026 |

* cited by examiner

STAGED FLUID CATALYTIC CRACKING PROCESSES INCORPORATING A SOLIDS SEPARATION DEVICE FOR UPGRADING NAPHTHA RANGE MATERIAL

FIELD OF THE DISCLOSURE

Embodiments herein generally relate to systems and processes for converting hydrocarbons using mixed catalyst systems. More specifically, embodiments herein are directed toward enhancing concentration of naphtha conversion catalysts within a reactor, while contacting the light and heavy naphtha at advantageous operating conditions.

BACKGROUND

In recent times, production of light olefins via fluid catalytic cracking (FCC) processes has been considered one of the most attractive propositions. Additionally, there is an ever increasing demand for petrochemical building blocks such as propylene, ethylene, and aromatics (benzene, toluene, xylenes, etc.). Further, integration of petroleum refineries with a petrochemicals complex has become a preferred option for both economic and environmental reasons.

Global trends also show that there is increased demand for middle distillates (diesel) than that of gasoline product. In order to maximize middle distillates from FCC process, it is required to operate FCC at lower reactor temperature and a different catalyst formulation. The downside of such change is decreased light olefins yield because of FCC unit operating at much lower reactor temperature. This will also reduce feedstock for Alkylation units.

Several fluidized bed catalytic processes have been developed over the last two decades, adapting to the changing market demands. For example, U.S. Pat. No. 7,479,218 discloses a fluidized catalytic reactor system in which a riser-reactor is divided into two sections of different radii in order to improve the selectivity for light olefins production. The first part of the riser reactor with lesser radii is employed for cracking heavy feed molecules to naphtha range. The enlarged radii portion, the second part of the riser reactor is used for further cracking of naphtha range products into light olefins such as propylene, ethylene, etc. Though the reactor system concept is fairly simple, the degree of selectivity to light olefins is limited for the following reasons: (1) the naphtha range feed streams contact partially coked or deactivated catalyst; (2) the temperature in the second part of the reaction section is much lower than the first zone because of the endothermic nature of the reaction in both sections; and (3) lack of the high activation energy required for light feed cracking as compared to that of heavy hydrocarbons.

Other various systems for the cracking of hydrocarbons have been developed, including those as described in U.S. Pat. Nos. 6,106,697, 7,128,827, 7,658,837, US2007/0205139, WO2010/067379, U.S. Pat. Nos. 6,869,521, 7,611,622, 5,944,982, US20060231461, and U.S. Pat. No. 7,323,099, among others.

U.S. Pat. No. 9,452,404 discloses a process for maximizing light olefins or middle distillates and light olefins. The system therein includes a two-reactor scheme to crack hydrocarbons, including a conventional riser reactor in combination with a countercurrent bubbling/turbulent fluidized bed reactor in which the mixed cracking catalysts are separated.

SUMMARY OF THE DISCLOSURE

In one aspect, embodiments disclosed herein relate to processes for the conversion of hydrocarbons. The processes may include separating an effluent from a moving bed reactor, the effluent being at a reactor outlet temperature and comprising a reaction product, a first particulate catalyst, and a second particulate catalyst. The first particulate catalyst may have a smaller average particle size and/or may be less dense than the second particulate catalyst. A first stream comprising the reaction product and the first particulate catalyst and a second stream comprising the second particulate catalyst may be recovered. The second stream comprising the second particulate catalyst may be admixed with a regenerated catalyst stream, where the regenerated catalyst stream may include both first particulate catalyst and second particulate catalyst at an elevated temperature. The admixing may produce a mixed catalyst at a temperature intermediate the elevated temperature and the reactor outlet temperature. In the moving bed reactor, the mixed catalyst may be contacted with a light naphtha feedstock to react hydrocarbons therein, the endothermic reaction reducing a temperature of the mixed catalyst to a second intermediate temperature. In the moving bed reactor, the mixed catalyst at the second intermediate temperature may then be contacted with a heavy naphtha feedstock to react hydrocarbons therein. Recovered from the moving bed reactor may be an effluent including the reaction product, the first particulate catalyst, and the second particulate catalyst.

In some embodiments, the moving bed reactor may be a vertical reactor, and the light naphtha feedstock may be introduced to the reactor at a lower elevation than the heavy naphtha feedstock. The elevated temperature of the regenerated catalyst stream may be in the range from about 1300° F. to about 1500° F., for example. Further, the first intermediate temperature may be in the range from about 900° F. to about 1200° F.; the second intermediate temperature may be in the range from about 800° F. to about 1150° F.; and the reactor effluent temperature may be in the range from about 700° F. to about 1150° F., in some embodiments.

The admixing of the catalyst streams may be performed in some embodiments within the moving bed reactor at an elevation below an elevation at which the light naphtha feedstock is introduced. In other embodiments, the admixing may be performed external to the moving bed reactor.

In another aspect, embodiments disclosed herein relate to systems for performing chemical reactions. The systems may include a separator configured to separate a reactor effluent comprising a reaction product, a first particulate catalyst, and a second particulate catalyst. The first particulate catalyst may have a smaller average particle size and/or may be less dense than the second particulate catalyst. From the separator may be recovered a first stream, comprising the reaction product and the first particulate catalyst, and a second stream, comprising the second particulate catalyst. A mixing device may be provided, the mixing device being configured to intimately contact the second stream comprising the second particulate catalyst with a catalyst stream, which may include a first particulate catalyst and a second particulate catalyst at an elevated temperature. The intimately contacting may produce a mixed catalyst at a uniform temperature intermediate the elevated temperature and the reactor outlet temperature. The system may also include a moving bed reactor configured to: contact the mixed catalyst with a first reactant at the intermediate temperature, reducing a temperature of the mixed catalyst to a second intermediate temperature; contact the mixed catalyst at the second intermediate temperature with a second reactant. A flow line may be provided to recover the reactor effluent from the moving bed reactor.

The mixing device, in some embodiments, may include a standpipe comprising: a first inlet to receive the second stream from the separator; a second inlet to receive the catalyst stream from a catalyst regenerator; and an outlet to supply the mixed catalyst to the moving bed reactor. In other embodiments, the mixing device may include: a first catalyst distributor disposed in a lower portion of the moving bed reactor, the catalyst distributor configured to receive the second stream from the separator and to disperse the second catalyst contained in the second stream into the moving bed reactor; a second catalyst distributor disposed proximate the first catalyst distributor configured to receive the catalyst stream from the catalyst regenerator and to disperse the first and second catalysts contained in the catalyst stream into the moving bed reactor and into contact with the second catalyst from the first catalyst distributor.

The system may further include a gas distributor, positioned below the first and second catalyst distributors, configured to fluidize and intimately mix the catalysts to attain the uniform intermediate temperature prior to contact with the first reactant. The system may also include structure internal to the moving bed reactor and located below a feed elevation of the first reactant to enhance contact of the catalysts to attain the uniform intermediate temperature prior to contact with the first reactant, in some embodiments.

In another aspect, embodiments disclosed herein relate to processes for the conversion of hydrocarbons. The process may include feeding a catalyst stream comprising a first particulate catalyst and a second particulate catalyst to a reactor. The first particulate catalyst may have a smaller average particle size and/or may be less dense than the second particulate catalyst. The process also includes feeding a light naphtha feedstock and a heavy naphtha feedstock to the reactor, wherein the light naphtha feedstock is introduced to the reactor at a lower elevation than the heavy naphtha feedstock. The light and heavy naphtha feedstocks may then be contacted with the first and second particulate catalysts to react hydrocarbons contained therein, allowing recovery of an overhead product from the reactor. The overhead product may include a converted hydrocarbon effluent, the second particulate catalyst, and the first particulate catalyst. The second particulate catalyst may then be separated from the overhead product to provide a first stream comprising the first particulate catalyst and the converted hydrocarbon effluent and a second stream comprising the separated second particulate catalyst. The separated second particulate catalyst in the second stream may be returned to the reactor. In some embodiments, a bottoms product may be recovered from the reactor, the bottoms product including the second particulate catalyst.

In some embodiments, the process may further include feeding a hydrocarbon feedstock and a mixture of first particulate catalyst and second particulate catalyst to a second reactor. The mixture of first and second particulate catalysts may be contacted with the hydrocarbon feedstock in the second reactor to crack the hydrocarbon feedstock and form a second reactor effluent comprising lighter hydrocarbons and a mixture of first and second particulate catalysts. Both of the first stream and the second reactor effluent may then be fed to a separator, the separator separating the first and second particulate catalysts from the lighter hydrocarbons and the converted hydrocarbon effluent to recover a hydrocarbon product and form a mixed catalyst comprising entrained hydrocarbons. In some embodiments, for example, the second reactor may be a riser reactor.

The entrained hydrocarbons may be stripped from the mixed catalyst and the stripped particulate catalyst may be fed to a catalyst regenerator, which may be used to regenerate the first and second particulate catalysts. The catalyst stream fed to the reactor may include regenerated first and second particulate catalysts from the regenerator, for example. The process may also include one or more of: feeding fresh second particulate catalyst to the reactor; and/or feeding fresh first particulate catalyst to the regenerator.

The process may further include feeding a mixture of first particulate catalyst and second particulate catalyst from the regenerator to the second reactor as the mixture of first and second particulate catalyst fed to the second reactor. In some embodiments, the second particulate catalyst may be ZSM-5 or ZSM-11, and the first particulate catalyst may be a Y-type cracking catalyst or an FCC cracking catalyst.

The process may further include separating the hydrocarbon products into two or more hydrocarbon fractions, including a light naphtha fraction and a heavy naphtha fraction. The light naphtha fraction and the heavy naphtha fraction may be fed to the reactor.

In another aspect, embodiments disclosed herein relate to systems for cracking hydrocarbons. The systems may include a mixing zone configured to: receive a catalyst mixture comprising a first particulate catalyst and a second particulate catalyst at a first elevated temperature; receive a catalyst stream comprising second particulate catalyst at a second lower temperature; admix the catalysts in the catalyst mixture and the catalyst stream to provide a mixed catalyst having a uniform intermediate temperature. A reaction zone may also be provided, the reaction zone being configured to: contact the catalyst mixture having a uniform intermediate temperature with a light naphtha feed to produce a hydrocarbon-catalyst mixture at a second intermediate temperature; contact the hydrocarbon-catalyst mixture at a second intermediate temperature with a light naphtha feed to produce a reactor effluent comprising first particulate catalyst, second particulate catalyst, and hydrocarbons. The system may also include a particle separator for separating second particulate catalyst from the reactor effluent to recover a hydrocarbon effluent stream comprising hydrocarbons and the first particles and the catalyst stream comprising second particulate catalyst. A feed line may be provided for returning separated second particles from the particle separator to the mixing zone.

The system, in some embodiments, may include a riser reactor for contacting a mixture of the first and the second particulate catalysts with a second hydrocarbon feedstock to convert at least a portion of the second hydrocarbon feedstock to lighter hydrocarbons and to recover a riser reactor effluent comprising the lighter hydrocarbons and the mixture of the first and second particulate catalysts. A separation system may receive the hydrocarbon effluent stream and the riser reactor effluent stream, the separation system being configured to separate the hydrocarbons contained therein from the first and second particulate catalysts. A regenerator may be provided for regenerating first and second particulate catalyst recovered in the separation system.

The system may also include a stripper disposed intermediate the separation system and the regenerator for stripping additional hydrocarbons from the separated particulate catalysts and for feeding the stripped particulate catalysts to the regenerator. A second separation system may also be provided for separating a hydrocarbon product stream recovered from the second separator into two or more hydrocarbon fractions including the light naphtha fraction and the heavy naphtha fraction. A first feed line may be provided for feeding fresh second particulate catalyst to the reactor, and a second feed line may also be provided for feeding fresh first particulate catalyst to the regenerator.

Other aspects and advantages will be apparent from the following description and the appended claims.

DETAILED DESCRIPTION

Figure 1C:
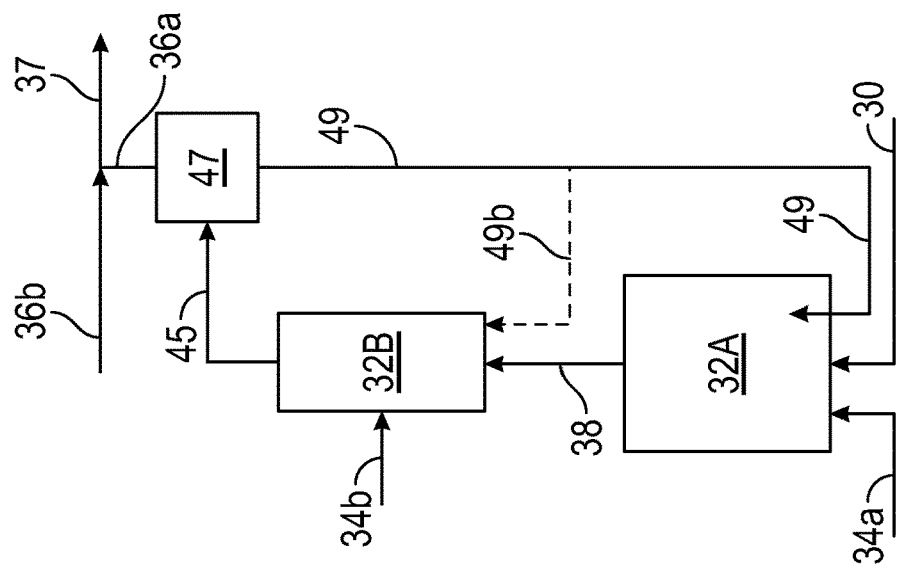
FIGS. 1A-1C are simplified flow diagrams of reactors systems according to embodiments herein.

As used herein, the terms "catalyst," "particle," "particulate catalyst," and like terms may be used interchangeably. Summarized above, and as further described below, embodiments herein may be used to separate mixed particulate catalyst materials based on size and/or density to achieve an advantageous effect in a naphtha conversion system. The particles or particulate materials used to facilitate catalytic or thermal reaction may include catalysts, absorbents, and/or heat transfer materials having no catalytic activity, for example.

In one aspect, embodiments herein relate to a fluid catalytic cracking apparatus and processes for the conversion of naphtha range hydrocarbons. Embodiments herein may advantageously convert lighter naphtha fractions at higher, more preferred cracking temperatures, followed by conversion of heavier naphtha fractions at a lower, more selective temperature. The contacting and conversion of the respective naphtha fractions at more preferred or optimal conditions may thus allow for more selective cracking and less production of light hydrocarbon ("gas") products, such as hydrogen, methane and ethane.

As used in some embodiments herein, naphtha range materials may be referred to as "light" and "heavy", while in other embodiments may be referred to as "light," "medium," and "heavy," depending upon the processing and the "split" used. Feeds of this type may be derived from full range naphtha, for example, typically having a boiling range of about $C_5$ to 215° C. (420° F.), and in some embodiments may include components boiling up to 480° F., 500° F., or even up to 520° F., as well as other hydrocarbon mixtures containing hydrocarbons boiling in this range.

Light naphtha fractions used in embodiments herein may have a boiling range of about $C_5$ or $C_6$ to 165° C. (330° F.) in some embodiments; from about $C_5$ or $C_6$ to about 280° F. in other embodiments; and from about $C_5$ or $C_6$ to about 250° F. in yet other embodiments. In other embodiments, a light naphtha fraction may have a boiling range end point in the range from about 49° C. (120° F.) to about 88° C. (190° F.).

Heavy naphtha fractions used in embodiments herein may have a boiling range of about 125° C. to 210° C. (260° F. to 412° F.) in some embodiments. Heavy naphtha according to embodiments herein may include hydrocarbons boiling at a temperature of greater than about 110° C. (230° F.) is some embodiments, greater than 121° C. (250° F.) in other embodiments, and greater than about 132° C. (270° F.) in yet other embodiments. In some embodiments, the heavy naphtha range fractions may include components boiling up to 400° F., 420° F., 480° F., 500° F., or even up to 520° F. In some embodiments, the heavy naphtha fraction may have an initial boiling point in the range from about 110° C. (230° F.) to about 132° C. (270° F.).

The initial boiling point and end boiling point of the naphtha fractions used may depend upon the sources, the catalysts being used to process the naphtha range materials, the number of feed locations or distributors provided in the reactor(s), as well as the operating temperatures proximate the feed locations or distributors. Where three or more feed locations or distributors are provided, the naphtha fractions may be provided in three fractions, including a medium naphtha fraction. For example, the medium naphtha fractions used herein may have a boiling range having a start point of about 60° C. (140° F.) to about 66° C. (150° F.) and an end point in the range from about 110° C. (230° F.) to about 132° C. (270° F.) or 138° C. (280° F.), such as a boiling range from about 83.3° C. (150° F.) to about 61.1° C. (230° F.). Further, while referred to as an initial or end point temperature, for some embodiments herein the intended target "cut" temperatures noted may be a 5 wt % or 15 wt % boiling point temperature on the lower limit and/or a 95% or 85% boiling point temperature on the upper limit, such as may be measured using ASTM D86 or ASTM D2887, for example.

Various types of reactors can be used to process the naphtha fractions according to embodiments herein. In some embodiments, the reactors may include motive beds. In other embodiments, the reactors may include fluidized bed regions and motive bed regions.

In operation, the reactor may receive a mixture of catalyst particles, including a first particulate catalyst and a second particulate catalyst, for example. The first particulate catalyst may have a smaller average particle size and/or may be less dense than the second particulate catalyst. In some embodiments, for example, the second particulate catalyst may include ZSM-5 or ZSM-11, and the first particulate catalyst comprises a Y-type cracking catalyst or an FCC cracking catalyst, although other catalysts may additionally or alternatively be used. Embodiments described below may be described with respect to specific catalyst types, but these descriptions are intended as exemplary of embodiments herein, and are not intended to limit the present invention to only use of these catalysts.

As the second (larger and/or more-dense) particulate catalyst may be more selective for the conversion of naphtha range materials, it is desired to concentrate the catalyst within the reactors. Conditions in the motive bed reactor may thus be adjusted to transport at least the first particulate catalyst from the reactor; to transport the first particulate catalyst and a portion of the second particulate catalyst in other embodiments; and to transport both the first particulate catalyst and the second particulate catalyst in yet other embodiments from the reactor, thus producing in some embodiments an effluent containing reaction products, first particulate catalyst, and second particulate catalyst. Accordingly, for a transport or motive bed reactor, the gas velocity within the reactor may be controlled to be greater than the transport velocity of the largest and/or most-dense catalyst particles.

The reactor effluent, including the transported catalyst particles, may then be fed to a separator. The combined stream of particles from the reactor may then be separated based on size and/or density, and the larger and/or more-dense particles may be returned to the reactor for continued reaction. The removal of the lighter and/or less-dense particles thus allows a higher, more beneficial concentration of the heavier and/or more-dense particles to be achieved within the reactor system.

Where a combination fluid bed/motive bed reactor is used, the gas velocity within the reactor may be controlled to be lower than the transport velocity of the largest and/or most-dense second catalyst particles, but higher than the transport velocity of the smaller and/or less-dense first catalyst particles. In other words, the heavier particles may form a turbulent bed within the fluidized bed region of the reactor, and the lighter and/or less dense particles may form a motive bed, transporting the lighter and/or less-dense particles from the reactor. Conditions may be such that a portion of the heavier and/or more-dense particles are entrained in the motive bed. The combined stream of particles from the reactor may then be separated based on size and/or density, and the larger and/or more-dense particles may be returned to the reactor for continued reaction. The removal and separation of the lighter and/or less-dense particles with the reactor effluent thus allows a higher, more beneficial concentration of the heavier and/or more-dense particles to be achieved within the reactor system.

The first and second catalyst particles may each be described as having a particles size distribution, which may be listed as Dx (e.g., D10, D25, D50, D75, and D90, where x percent of the particles have a diameter less than a diameter D, and the mean particle size is given as D50, where the particle size distribution may be measured by screening or light scattering, for example. In some embodiments, the superficial gas velocity in the reactor may be selected to transport particles having a size smaller than the D10, D25, D50, D75, or D90 of the larger and/or more-dense particles. In other embodiments, the superficial gas velocity in the reactor may be selected to transport particles having a size of at least the D75 or D90 of the larger and/or more-dense particles, thus transporting a majority or all of the particles from the reactor to the particle separator.

The effluent from the moving bed reactor or moving bed reaction zone may then be fed, as noted above, to a particle separation device. The particle separation device may be used to separate the catalyst particles based on size and/or density, allowing to recover a first stream comprising the reaction product and the first particulate catalyst and a second stream comprising the second particulate catalyst.

Feed of the mixed catalyst system, including both first particulate catalyst and second particulate catalyst, is typically received from a catalyst regenerator, and is generally at a regeneration temperature well in excess of preferred light naphtha conversion conditions. In addition to concentrating the preferred catalyst within the reactor system, embodiments herein may also advantageously provide a lower initial contact temperature of the mixed catalyst with the hydrocarbon feed. The lower initial contact temperature may be provided by intimately contacting and mixing the second stream comprising the second particulate catalyst with the regenerated mixed catalyst stream comprising first particulate catalyst and second particulate catalyst at an elevated temperature. The intimate mixing and contact of the particles produces a mixed catalyst: (i) having a higher concentration of heavier and/or more-dense second particulate catalyst than the catalyst feed from the regenerator, (ii) at a temperature intermediate the elevated regenerator temperature and the reactor outlet temperature. As a result, in the moving bed reactor, the mixed catalyst may be contacted with a light naphtha feedstock to react hydrocarbons therein, the endothermic reaction reducing a temperature of the mixed catalyst to a second intermediate temperature suitable for contacting, in the moving bed reactor, the mixed catalyst at the second intermediate temperature and a heavy naphtha feedstock to react hydrocarbons therein. The effluent comprising the reaction product, the first particulate catalyst, and the second particulate catalyst may then be recovered from the reactor and transported to the particle separator for continued processing as described above, separating the larger and/or more-dense particles for return to the reactor, building the concentration of these larger and/or more-dense particles within the reactor and providing a means to control the temperature of the catalyst provided from the regenerator.

As an example of the moving bed reactor system, the moving bed reactor may be a vertical reactor. The light naphtha feedstock may be introduced to the reactor at a lower elevation than the heavy naphtha feedstock. The catalyst mixture fed to the reactor from a catalyst regenerator may be at an elevated temperature in the range from about 1300° F. to about 1500° F., for example. The first intermediate temperature, i.e., the temperature of the mixed catalyst following intimate contact with the separated larger and/or more-dense particles, may be in the range from about 900° F. to about 1200° F., for example. The light naphtha may be contacted with the catalyst at the first intermediate temperature, converting a portion of the light naphtha to lighter hydrocarbons, and further decreasing the temperature of the mixed catalyst particles to a second intermediate temperature. The second intermediate temperature, i.e., following endothermic conversion of the light naphtha, may be in the range from about 800° F. to about 1150° F. The heavy naphtha may be contacted with the catalyst at the second intermediate temperature, converting a portion of the heavy naphtha to lighter hydrocarbons, and further decreasing the temperature of the mixed catalyst particles to a reactor outlet temperature, such as a reactor effluent temperature in the range from about 700° F. to about 1150° F. For reactors including more than two feed locations or feed distributors, a medium naphtha fraction may be introduced intermediate the elevation of the light and heavy naphtha feed elevations. It has been found by the present inventors that feed of a light naphtha feed lower than a heavy naphtha feed for moving bed reactors according to embodiments herein provides preferred kinetics for the desired reaction of the light and heavy naphtha cracking.

As mentioned above, the catalyst particles separated from the reactor effluent, concentrated in the reactor, may be used to modify a temperature of the regenerated catalyst prior to hydrocarbon contact, by intimately mixing the separated catalyst particles with the regenerated catalyst particles. In some embodiments, the admixing may be performed in the moving bed reactor at an elevation below an elevation at which the light naphtha feedstock is introduced. In other embodiments, the admixing may be performed external to the moving bed reactor.

Embodiments herein include a mixing device configured to intimately contact the second stream comprising the second particulate catalyst with a catalyst stream, the catalyst stream comprising first particulate catalyst and second particulate catalyst at an elevated temperature, such as may be received from a catalyst regenerator. The intimate contacting of the two catalyst streams produces a mixed catalyst at a uniform temperature intermediate the elevated temperature and the reactor outlet temperature. As used herein, a "uniform temperature" refers to a catalyst bed with particles having a temperature within a few degrees of the mean bed temperature. In some embodiments, uniform temperatures herein may include particles having a temperature within +/−20° C. of the mean bed temperature; +/−15° C. of the mean bed temperature in other embodiments; +/−10° C. of the mean bed temperature in other embodiments; +/−5° C. of the mean bed temperature in other embodiments; and +/−2° C. of the mean bed temperature in yet other embodiments. Although the catalyst particles are solids, a mixing device may be configured to provide contact time and collisions during transport to the naphtha feed location sufficient to achieve the desired uniform temperature for reaction with the light naphtha.

As noted above, regenerator temperatures may be greater than 1300° F., whereas it is beneficial to contact the light naphtha with the catalyst at temperatures of less than 1250° F. To achieve the desired uniform temperature of the combined catalyst streams, the regenerated catalyst (mixed catalyst stream) may be combined with the returned catalyst (second stream) at feed ratios ranging from 0.2 to 1 to 5:1 in some embodiments; 0.3:1 to 3:1 in other embodiments; and 0.5:1 to 1.5:1 in yet other embodiments. The ratio of regenerated to return catalyst used may depend on the desired uniform temperature, the catalyst to oil ratio, and other reactor variables.

In some embodiments, the uniform temperature may be achieved in a mixing device, such as a contact area located in a lower portion of the reactor system. The mixing device may thus include a first catalyst distributor and a second catalyst distributor disposed in a lower portion of the moving bed reactor. The first catalyst distributor may be configured to receive the second stream from the separator and to disperse the second catalyst contained in the second stream into the moving bed reactor. The second catalyst distributor may be disposed proximate the first catalyst distributor and configured to receive the mixed catalyst stream from the catalyst regenerator and to disperse the first and second catalysts contained in the catalyst stream into the moving bed reactor and into contact with the second catalyst from the first catalyst distributor. The transport velocity in this lower portion of the reactor may be maintained low enough to provide residence time and intimate contacting and mixing of the two catalyst streams in the catalyst feed zone, achieving the desired uniform temperature prior to contact with the light naphtha feed.

In some embodiments, a gas distributor may be positioned below the first and second catalyst distributors. The gas distributor may be configured to fluidize and intimately mix the catalysts to attain the uniform intermediate temperature prior to contact with the light naphtha. The gas introduced by the gas distributor may be an inert, such as nitrogen or steam, among other transport media.

In various embodiments, the system may also include structured internals within the moving bed reactor and located below a feed elevation of the first reactant, such as the light naphtha. The structure may provide a tortuous path for transport of the catalyst particles, enhancing contact of the catalysts to attain the uniform intermediate temperature prior to contact with the naphtha.

Absent the intimate contact and reduction of the temperature of the regenerated catalyst, contact with the light naphtha may result in excessive cracking or other reactions, producing undesirable light gases, such as hydrogen and methane, for example. Further, it is possible that the catalyst temperature may remain higher than desired for contact with the heavy naphtha feedstock, again resulting in decreased reactor performance. However, with the uniform intermediate temperatures that are achievable via embodiments herein, both the light naphtha and heavy naphtha may be contacted with the mixed catalyst system at advantageous conditions, improving reactor performance and resulting in a more desirable product mixture.

Figure 1B:
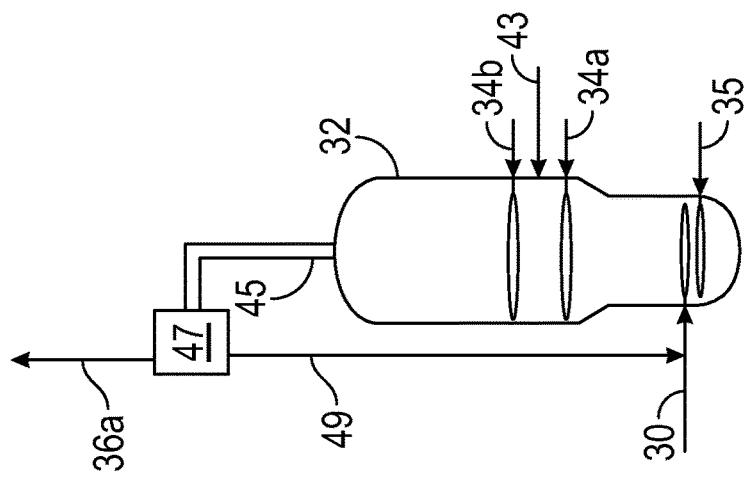
Figure 1A:
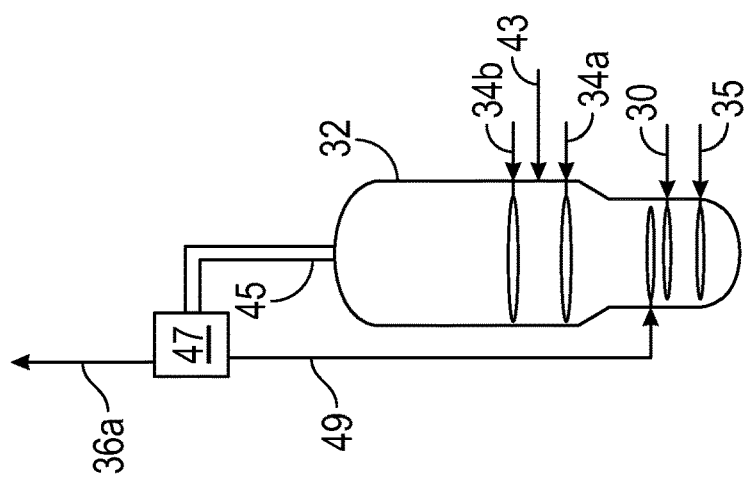

Referring now to FIGS. 1A and 1B, reactor systems according to embodiments herein are illustrated. Reactor 32 may receive a mixture of catalyst particles, including a first particulate catalyst and a second particulate catalyst, for example, via flow line 30, and may be introduced into reactor 32 via a catalyst distributor. The first particulate catalyst may have a smaller average particle size and/or may be less dense than the second particulate catalyst. In some embodiments, for example, the second particulate catalyst may include ZSM-5 or ZSM-11, and the first particulate catalyst comprises a Y-type cracking catalyst or an FCC cracking catalyst, although other catalysts may additionally or alternatively be used. These catalysts may be used, for example, to crack a light naphtha feedstock and a heavy naphtha feedstock introduced to the reactor 32 via flow lines 34a and 34b, respectively.

As described above, reactor 32 may be operated as a transport reactor, maintaining a sufficient superficial gas velocity to transport the mixed catalyst system with the reaction effluent from the reactor 32 to a separator 47. An effluent from reactor 32 may be recovered via flow line 45, and may thus include cracked hydrocarbon products, unreacted hydrocarbon feedstock, nitrogen or steam (a stripping media or added fluidization gas, such as added via flow line 35), and a catalyst mixture, including essentially all of the lighter and/or smaller catalyst and a portion or all of the larger and/or more-dense catalyst introduced to the reactor.

The effluent may then be transported via flow line 45 to a solids separator 47. Separator 47 may be a separator configured to separate the two types of catalyst based on their physical properties, namely particle size and/or density. For example, separator 47 may use differences in inertial forces or centrifugal forces to separate FCC catalyst from the ZSM-5. The solids separation vessel 47 is an external vessel to the second reactor 32 and is operated at hydrodynamic properties that enhance the separation of the two types of catalyst based on their physical properties.

After separation in separator 47, the smaller and/or lighter catalyst (such as a Y-type zeolite or FCC catalyst) may be recovered along with the reactor effluent vapors via separator outlet line 36a. The larger and/or denser catalyst (such as a ZSM-5 or ZSM-11) may be returned via flow line 49 and an associated catalyst distributor to reactor 32 for continued reaction with the hydrocarbon feeds introduced through distributors 34a, 34b.

FIG. 1B illustrates an alternative to the use of multiple catalyst distributors within vessel 32. Rather, the mixed catalyst feed 30 and the catalyst in stream 49 may be admixed upstream of a single catalyst distributor used to introduce the mixture having an enhanced concentration of second catalyst into vessel 32.

Entrainment of essentially all of the lighter/smaller catalyst and a portion of the larger and/or more-dense catalyst, subsequent separations, and recycle of the larger and/or denser catalyst to reactor 32 may allow for a significant accumulation of the larger and/or denser catalyst in reactor 32. As this catalyst is more selective for the cracking of $C_4$ and naphtha range hydrocarbons, the accumulation of the larger and/or denser catalyst may provide a selectivity and yield advantage. Further, operation of the reactor in a fluidization flow regime to entrain both types of catalyst may provide for improved operability of the reactor or flexibility in operations, as discussed above.

In some embodiments, fresh catalyst, such as the larger and/or more-dense second catalyst, may be added to directly to the reactor vessel 32 via flow line 43. The regenerated catalyst mixture, at an elevated temperature, transfers from a regenerator (not illustrated) through pipe 30 to the reactor vessel 32. The mixture and intimate contact of catalyst streams 30, 49 may provide a uniform catalyst temperature, as described above, prior to contact with the light naphtha feed 34a. It is anticipated that the addition rate of fresh catalyst via flow line 43 may be low, and may have minimal impact on overall catalyst temperature. Nonetheless, the introduction point of the fresh catalyst 43 may be proximate inlets 30, 49, such that it contributes to achieving a desired uniform temperature, or may be intermediate light naphtha feed 34a and heavy naphtha feed 34b, thereby further reducing the temperature of the mixed catalyst to a more preferred heavy naphtha reaction temperature proximate the introduction point of heavy naphtha feed 34b.

The catalyst bed in the reactor vessel 32 is expected to operate in turbulent bed, bubbling bed or fast fluidization regimes. A light naphtha feed 34a, as illustrated, may be fed into the reactor 32 and converted to light olefins in the presence of the mixed catalyst. The lifting gas 35, along with product gas in the vessel 32, will lift the solids, including both catalysts, through the pipe 45 to the solids separation vessel 47. Due to the differences in size and/or density of the two catalyst particles, most of the heavier catalyst particles (ZSM-5 or ZSM-11, for example) will be separated from the lighter (Y-type or FCC catalyst, for example) in the solids separation vessel 47 and transferred via return line 49 back to the reactor 32. The lighter catalyst particles will then be transported downstream with the reactor effluent via flow line 36a for continued processing, such as in a separator, stripper, and/or regenerator.

Although not illustrated, vessel 32 may include a bottom flange or outlet allowing the vessel to be de-inventoried of catalyst. Such an outlet may also be used to periodically remove larger and/or heavier catalyst particles that may accumulate within vessel 32, if necessary.

While the motive bed or transport reactor is illustrated in FIGS. 1A and 1B as a single contiguous reactor vessel 32, embodiments herein also contemplate utilizing separate vessels for the first (e.g., light naphtha) and second (e.g., heavy naphtha) reaction stages, as illustrated in FIG. 1C, where like numerals represent like parts. As illustrated in FIG. 1C, the reactor effluent 45 recovered from the uppermost reactor stage may be fed to separator 47 for separation of the heavier and/or more-dense catalyst from the reaction products and lighter and/or less-dense catalyst.

The lighter and/or less-dense catalyst and the reaction products may be recovered via flow line 36a. Optionally, the reaction products and catalyst in flow line 36a may be quenched via a quench stream. The quench stream may be a hydrocarbon feed such as heavy vacuum gas oil or heavy residue feed, light cycle oil (LCO), or steam, which may be injected into the separator outlet line 36a through a distributor 36b. The (optionally quenched) reaction effluent may then be fed downstream via flow line 37 for further processing.

The heavier and/or more-dense catalyst particles may be recovered from separator 47 via flow line 49. Flow line 49 may be used to concentrate the heavier and/or more-dense catalyst within reaction stages 32A, 32B. In some embodiments, the flow of catalyst in line 49 may be fully directed to the lowermost reaction stage 32A. Optionally, a portion of the catalyst in line 49 may be directed via flow line 49B to an intermediate or upper reaction stage 32B. Regardless of the catalyst split used, sufficient catalyst should be directed toward the lowermost reaction stage 32A for contact and admixture with regenerated catalyst stream 30, so as to achieve the desired uniform catalyst mixture temperature prior to contact of the catalyst mixture with light naphtha feed 34a.

The superficial gas velocity in lower reaction stage 32A may be maintained sufficiently high to transport all of the lighter and/or less-dense catalyst via transfer line 38 to an upper reaction stage 32B. The heavy naphtha feed 34b may then be contacted with the catalyst mixture, and conditions in reaction stage 32B may be maintained sufficient to transport all of the lighter and/or less-dense catalyst along with the reaction products via flow line 45 to separator 47.

As described above, systems according to embodiments herein may include a separator 47 configured to separate the two types of catalysts based on their physical properties, such as particle size and/or density. Separator 47 may be a cyclone separator, a screen separator, mechanical sifters, a gravity chamber, a centrifugal separator, a baffle chamber, a louver separator, an in-line or pneumatic classifier, or other types of separators useful for efficiently separating particles based on size and/or hydrodynamic properties.

Figure 2:
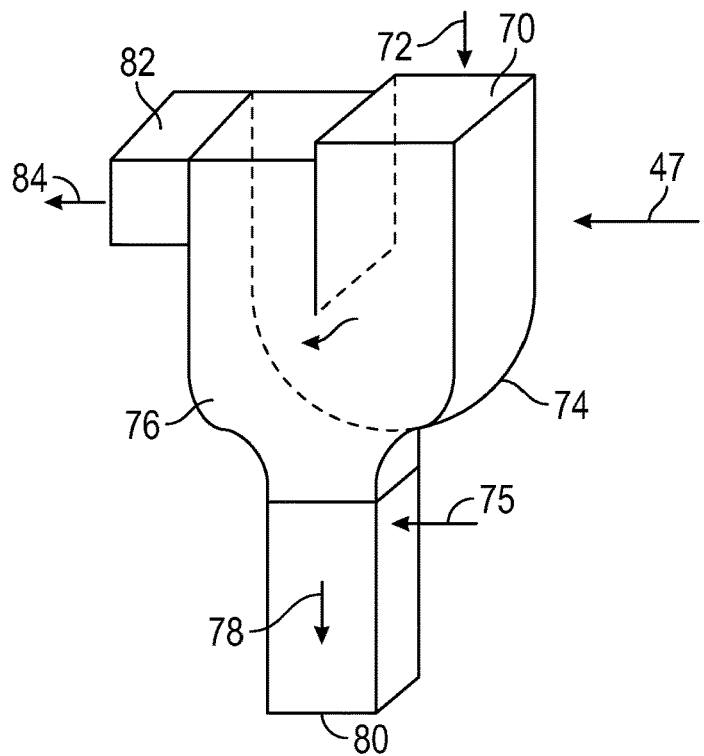
FIGS. 2-5 illustrate separators useful in reactor systems according to embodiments herein.

Examples of separators or classifiers useful in embodiments herein are illustrated in FIGS. 2-5. In some embodiments, separator 47 may be a U-shaped inertial separator, as illustrated in FIG. 2, to separate two kinds of solid particles or catalysts with different particle sizes and/or particle density. The separator may be built in the form of U-shape, having an inlet 70 at the top, a gas outlet 84 at the other end of the U, and a main solid outlet 80 at the base of U-shaped separator.

A mixture 72 of solid particles or catalysts with different sizes is introduced along with a carrier gas stream through inlet 70 and inertial separation forces are applied on the solids by making no more than one turn to separate the different sizes of solid particles. Larger and/or more-dense solid particles 78 preferentially go downward in sections 74/76 to a standpipe or dipleg 80 connected to the base of U-shape while lighter or smaller solid particles are preferentially carried along with the gas stream to outlet 82, where the mixture 84 of small particles and gases may be recovered. The solid outlet 80 at the base of U-shaped separator (the inlet of the standpipe or dipleg used to flow the larger and/or more-dense catalyst particles back to the second reactor 32) should be large enough to accommodate the normal solid/catalyst flow.

By controlling the gas flow rates entering the downward standpipe and exiting the main gas stream outlet, the overall separation efficiency of the U-shape inertial separator and the selectivity to separate larger and/or more-dense particles from smaller and/or less dense particles can be manipulated. This extends to a fully sealed dipleg where the only gas stream exiting the dipleg are those entrained by the exiting solid/catalyst flow. As the U-shaped inertial separator provides the ability to manipulate the separation efficiency, intermediate sized particles, which have the potential to accumulate in the system as noted above, may be periodically or continuously entrained with the hydrocarbon products recovered from separator 47 for separation in vessel 8 and regeneration in regenerator 24.

In some embodiments, a gas sparger 75 or extra steam/inert gas may be provided proximate a top of outlet section 80, such as near a top of the standpipe inlet. The additional lift gas provided within the separator may further facilitate the separation of larger and/or more-dense solid particles from less dense and/or smaller solid particles, as the extra gas may preferentially lift lighter solid particles to gas outlet 84, resulting in better solid classification.

The cross sectional area of the U-shaped separator at the inlet 70, outlet 82 and throughout the U-shaped separator (including areas 74, 76) may be adjusted to manipulate the superficial gas velocity within the apparatus to control the separation efficiency and the selectivity. In some embodiments, a position of one or more of the separator walls may be adjustable, or a movable baffle may be disposed within one or more sections of the separator, which may be used to control the separation efficiency and selectivity. In some embodiments, the system may include a particle size analyzer downstream of outlet 82, enabling real-time adjustment of the flow configuration through the U-shaped separator to effect the desired separations.

Utilization of U-shaped inertial separators connected in series or a combination of U-shape inertial separators and cyclones may provide flexibility to allow simultaneously achievement of both target overall separation efficiency and target selectivity of larger and/or more-dense particles over smaller and/or less dense particles.

The secondary reactor 32 may also be equipped with baffles or structured internals such as modular grids as described in U.S. Pat. No. 7,179,427. Other types of internals that enhance contact efficiency and product selectivity/yields may also be used. The internals may enhance the catalyst distribution across the reactor and improve the contact of feed vapors with catalyst, leading to an increase in the average reaction rate, enhance the overall activity of the catalyst and optimize the operating conditions to increase the production of light olefins.

Embodiments disclosed herein use Y-type zeolite or conventional FCC catalyst, maximizing the conversion of heavy hydrocarbon feeds. The Y-type zeolite or FCC catalyst is of a smaller and/or lighter particle size than the ZSM-5 or similar catalysts used to enhance the production of light olefins in the motive bed or transport reactor. The ZSM-5 or similar catalysts have a larger particle size and/or are more-dense than the Y-type zeolite or FCC catalysts used to enhance separations of the catalyst types in each of the motive bed or transport reactor and the solids separator. The superficial gas velocity of vapors in the motive bed or transport reactor is maintained such that it allows entrainment of the Y-type zeolite or FCC catalyst and a portion of the ZSM-5 or ZSM-11 catalyst out of the motive bed or transport reactor, and the solids separator may utilize the differences in single particle terminal velocities or differences between minimum fluidization/minimum bubbling velocities to separate and return the ZSM-5/ZSM-11 to the motive bed or transport reactor. This concept allows the elimination of two stage FCC systems and hence a simplified and efficient process. The catalysts employed in the process could be either a combination of Y-type zeolite/FCC catalyst and ZSM-5 or other similar catalysts, such as those mentioned in U.S. Pat. Nos. 5,043,522 and 5,846,402. Other various catalysts mixtures may also be used in such a reactor system.

The entrainment of both catalysts from the motive bed or transport reactor, subsequent separation, and recycle and accumulation of the ZSM-5/ZSM-11 catalyst in the motive bed or transport reactor eliminates any potential restriction on superficial gas velocity in the reactor. The use of a solids separation vessel thus provides process flexibility in the reactor, allowing the motive bed or transport reactor to be operated in bubbling bed, turbulent bed, or fast fluidization regimes, rather than restricting the operations to only a bubbling bed regime. The solids separation vessel may be a cyclone or other vessel where solids and gases are introduced at a common inlet, and through degassing, inertial and centrifugal forces, the particles are separated based on size and/or density, with the majority of the smaller FCC type particles entraining with the vapor outlet, and the larger and/or denser ZSM-5 or ZSM-11 type particles returning via a dense phase standpipe or dipleg back to the motive bed or transport reactor vessel 32.

Figure 3:
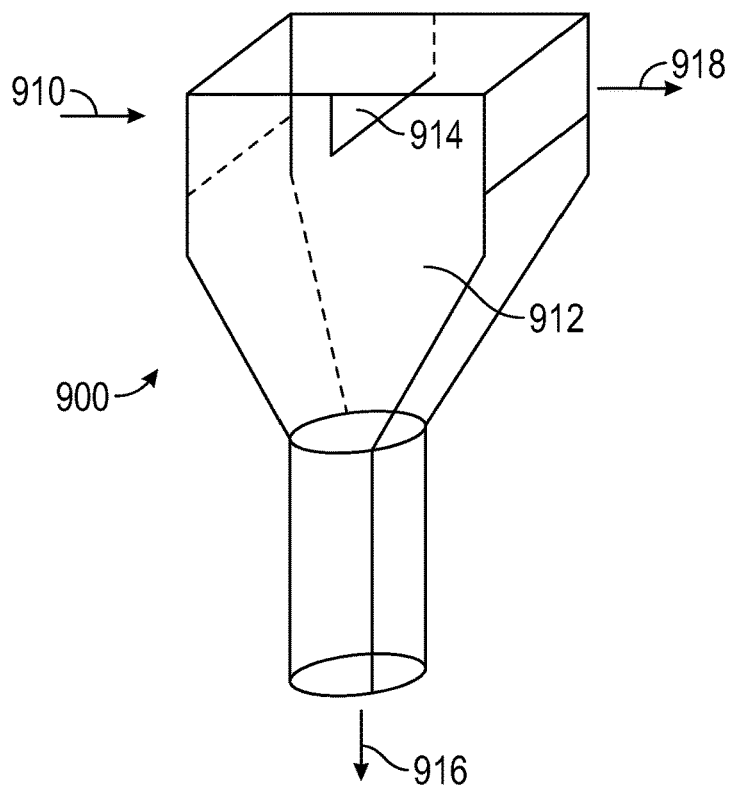

In addition to the U-type particle separator described in relation to FIG. 2, FIGS. 3-5 illustrate various additional particle separation devices for use in embodiments herein. Referring to FIG. 3, a baffle chamber separator 900 for separating catalysts or other particles based on size and/or density may include an inlet 910, such as a horizontal conduit. The vapors and particles contained in the horizontal conduit then enter a chamber 912, before being deflected by a baffle 914. The chamber 912 is connected to a first vertical outlet 916 and a first horizontal outlet 918. The baffle 914 may be located in the middle of chamber 912, proximate the inlet 910, or proximate the horizontal outlet 918 of the chamber. The baffle may be at an angle or moveable such that the baffle may be used to deflect more or less catalyst particles, and may be configured for a particular mixture of particles.

Processes herein may utilize the baffle chamber separator 900 to segregate larger and/or denser particles from smaller and/or less dense particles contained in a carrier gas, such as a hydrocarbon reaction effluent. The baffle chamber separator 900 may be configured to: separate at least a portion of a second particle type from the carrier gas and a first particle type, recover the second particle type via the first vertical outlet 916 and recover a mixture including the carrier gas and the first particle type via the first horizontal outlet 918. The separator may also include a distributor (not illustrated) disposed within or proximate the first vertical outlet for introducing a fluidizing gas, facilitating additional separation of the first particle type from the second particle type.

Figure 4:
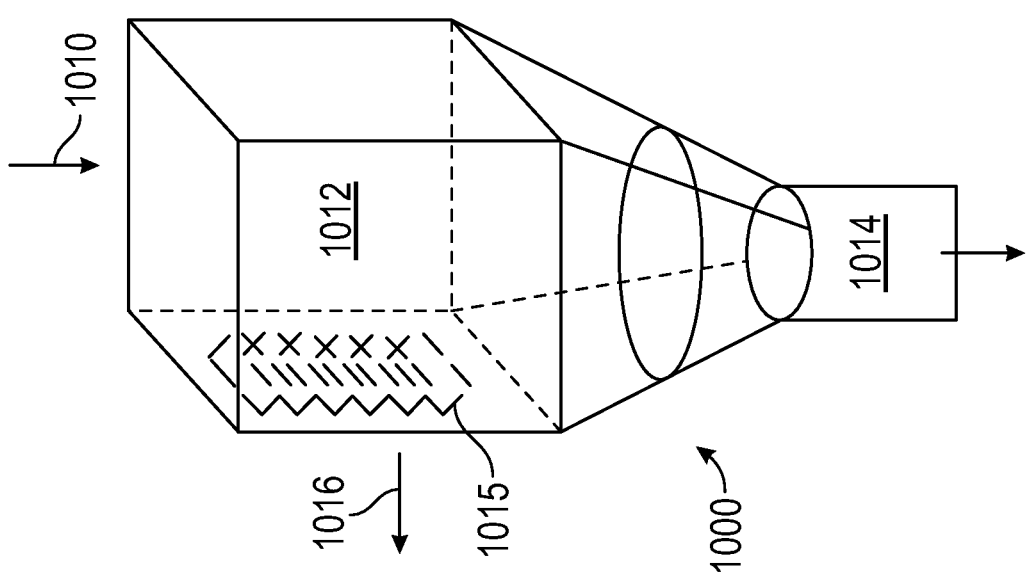

Referring now to FIG. 4, a louver separator for use in accordance with embodiments herein is illustrated. Similar to other separators illustrated and described, the louver separator 1000 may be used for separating catalysts or other particles based on size and/or density. The louver separator 1000 may include a vertical inlet 1010 connected to a chamber 1012 where one or more vertical sides 1014 of the chamber are equipped with narrow slot outlets 1016, which may be described as louvers. The number of louvers may vary depending on the application, such as the desired particle mixture to be separated, and the angle of the louver may be adjustable in order to control the amount of vapor passing through and leaving the louver outlets. The chamber 1012 is also connected to a first vertical outlet 1014 at the bottom of the chamber.

Processes herein may utilize the louver separator 1000 to segregate larger and/or denser particles from smaller and/or less dense particles contained in a carrier gas, such as a hydrocarbon reaction effluent. The louver separator 1000 may be configured to: separate at least a portion of the second particle type from the carrier gas and the first particle type, recover the second particle type via the first vertical outlet 1014 and recover the carrier gas and the first particle type via the louver outlets 1016. The separator may also include a distributor (not illustrated) disposed within or proximate the first vertical outlet for introducing a fluidizing gas, facilitating additional separation of the first particle type from the second particle type.

Figure 5:
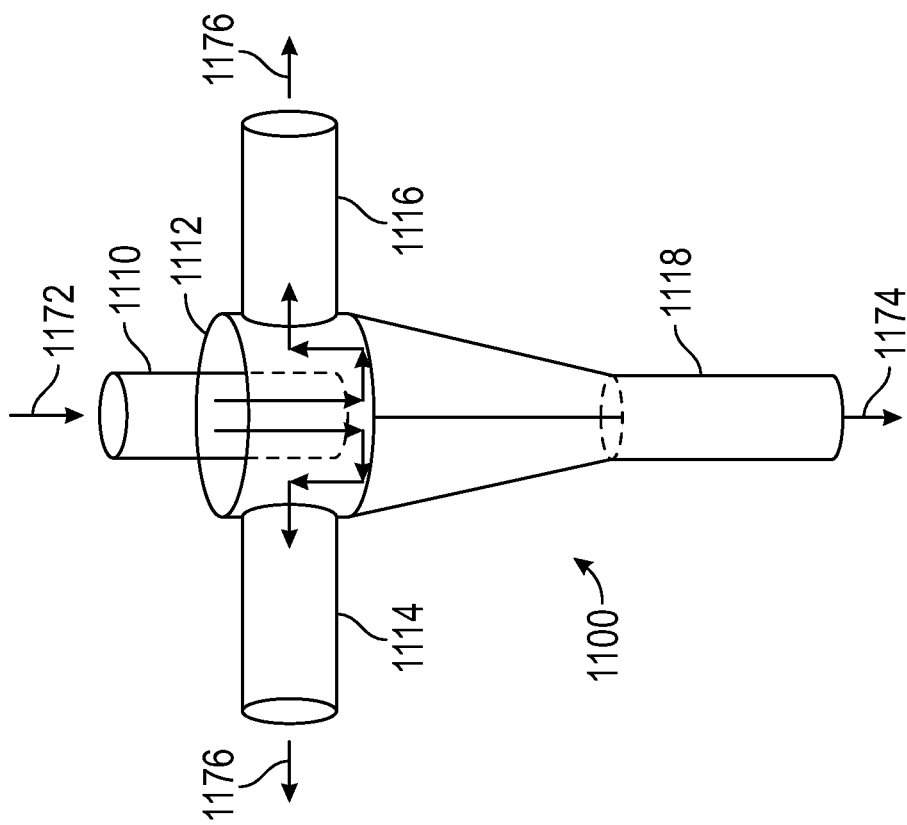

Referring now to FIG. 5, an inertial separator 1100 for use in accordance with embodiments herein is illustrated. Similar to other separators illustrated and described, the inertial separator 1100 may be used for separating catalysts or other particles based on size and/or density. The separator may include an inlet 1110 at the top of and extending into a chamber 1112. In some embodiments, the height or disposition of inlet 1110 within chamber 1112 may be adjustable. The separator may also include one or more side outlets 1114, 1116, such as one to eight side outlets, and a vertical outlet 1118. The separator may also include a distributor (not illustrated) disposed within or proximate the vertical outlet 1118 for introducing a fluidizing gas.

A mixture 1172 of solid particles or catalysts with different sizes is introduced along with a carrier gas stream through inlet 1110. The gases in the mixture 1172 are preferentially directed toward outlets 1114, 1116 based on pressure differentials, and inertial separation forces are applied on the solids by making the particles and carrier gas turn from the extended inlet 1110 within chamber 1112 to flow toward outlets 1114, 1116, the inertial forces separating the different sizes/densities of particles. Larger and/or heavier solid particles 1174 preferentially go downward in sections 1118 to a standpipe or dipleg (not shown) connected to the base of the separator, while lighter or smaller solid particles 1176 are preferentially carried along with the gas stream to outlets 1114, 1116, where the mixture of small particles and gases may be recovered.

In each of the separators described herein, by controlling the gas flow rates entering the downward standpipe/separation chamber and exiting the main gas stream outlet, the overall separation efficiency of the separator and the selectivity to separate heavier and/or larger particles from lighter or smaller particles can be manipulated. This extends to a fully sealed dipleg where the only gas stream exiting the dipleg are those entrained by the exiting solid/catalyst flow.

In some embodiments, a gas sparger or extra steam/inert gas may be provided proximate a top of the heavy/dense particle outlet section, such as near a top of the standpipe inlet. The additional lift gas provided within the separator may further facilitate the separation of heavier and/or larger solid particles from lighter or smaller solid particles, as the extra gas may preferentially lift lighter solid particles to the gas outlets, resulting in better solid classification.

The particle separators described herein may be disposed external or internal to a vessel. Further, in some embodiments, the large/dense particle outlets of the particle separators may be fluidly connected to an external vessel, providing for selective recycle or feed of the separated particles to the desired reactor, so as to maintain a desired catalyst balance, for example.

In another aspect, embodiments herein relate to a fluid catalytic cracking apparatus and process for maximizing the conversion of a heavy hydrocarbon feed, such as vacuum gas oil and/or heavy oil residues into very high yield of light olefins, such as propylene and ethylene, aromatics and gasoline with high octane number or middle distillates, while concurrently minimizing the yield of heavier bottom product and light gases such as methane. To accomplish this goal, a secondary reactor, which may be a motive bed or transport reactor, such as the catalyst-concentrating reactors described above with regard to FIGS. 1A-1C, can be integrated with a conventional fluid catalytic cracking reactor, such as a riser reactor.

A heavy hydrocarbon feed may be catalytically cracked to naphtha, middle distillates and light olefins in the riser reactor, which is a pneumatic flow co-current type reactor. To enhance the yields and selectivity to light olefins (ethylene and propylene), cracked hydrocarbon products from the riser reactor, such as naphtha range hydrocarbons (olefins and paraffins), may be recycled and processed in the motive bed or transport reactor (the catalyst-concentrating reactor). Alternatively, or additionally, external feed streams, such as $C_4$, naphtha, or other hydrocarbon fractions from other processes such as a steam cracker, metathesis reactor, or delayed coking unit, and naphtha range streams, such as straight run naphtha or from delayed coking, visbreaking or natural gas condensates, among other hydrocarbon feedstocks, may be processed in the motive bed or transport reactor to produce light olefins, such as ethylene and propylene. The integration of the motive bed or transport reactor with a conventional FCC riser reactor according to embodiments disclosed herein may overcome the drawbacks of prior processes, may substantially increase the overall conversion and light olefins yield, may decrease the production of light gases such as hydrogen and methane, and/or may increases the capability to process heavier feedstocks.

Integration of the motive bed or transport reactor with a conventional FCC riser reactor according to embodiments disclosed herein may be facilitated by (a) using a common catalyst regeneration vessel, (b) using two types of catalyst, one being selective for cracking heavier hydrocarbons and the other being selective for the cracking of $C_4$ and naphtha range hydrocarbons for the production of light olefins, and (c) using a motive bed or transport reactor or a catalyst-concentrating reactor as described with respect to FIGS. 1A-1C in a flow regime that will partially separate the two types of catalysts, favoring the contact of the $C_4$s or naphtha feeds with the catalyst selective for cracking the same and producing light olefins.

To enhance the operation window of the secondary reactor, and to provide greater process flexibility, the motive bed or transport reactor may be operated in a flow regime to entrain the catalyst selective for cracking heavier hydrocarbons, and to entrain a portion of the catalyst selective for the cracking of $C_4$ and naphtha range hydrocarbons. The cracked hydrocarbon products and the entrained catalysts are then fed to a separator to separate the catalyst selective for the cracking of $C_4$ and naphtha range hydrocarbons from the cracked hydrocarbon products and the catalyst selective for cracking heavier hydrocarbons. This solids separation vessel is an external vessel to the reactor and is operated at hydrodynamic properties that enhance the separation of the two types of catalyst based on their physical properties, such as particle size and/or density. The separated catalyst, selective for the cracking of $C_4$ and naphtha range hydrocarbons, may then be returned to the motive bed or transport reactor for continued reaction and providing an enhanced concentration of the catalyst selective for the cracking of $C_4$ and naphtha range hydrocarbons within the motive bed or transport reactor, improving selectivity of the overall process while also improving the overall process flexibility due to the enhanced operating window.

As noted above, the cracking system may utilize two types of catalysts, each favoring a different type of hydrocarbon feed. The first cracking catalyst may be a Y-type zeolite catalyst, an FCC catalyst, or other similar catalysts useful for cracking heavier hydrocarbon feedstocks. The second cracking catalyst may be a ZSM-5 or ZSM-11 type catalyst or similar catalyst useful for cracking $C_4$s or naphtha range hydrocarbons and selective for producing light olefins. To facilitate the two-reactor scheme disclosed herein, the first cracking catalyst may have a first average particle size and density, and may be smaller and/or lighter than those for the second cracking catalyst, such that the catalysts may be separated based on density and/or size (e.g., based on terminal velocity or other characteristics of the catalyst particles).

In the catalyst regeneration vessel, spent catalyst recovered from both the riser reactor and the motive bed or transport reactor is regenerated. Following regeneration, a first portion of the mixed catalyst may be fed from the regeneration vessel to a riser reactor (co-current flow reactor). A second portion of the mixed catalyst may be fed from the regeneration vessel to the motive bed or transport reactor.

In the co-current flow (riser) reactor, a first hydrocarbon feed is contacted with a first portion of the regenerated catalyst to crack at least a portion of the hydrocarbons to form lighter hydrocarbons. An effluent may then be recovered from the co-current flow reactor, the effluent comprising a first cracked hydrocarbon product and a spent mixed catalyst fraction.

In the catalyst-concentrating second reactor, such as described and illustrated with respect to FIGS. 1A-1C, a light naphtha may be contacted with the catalyst mixture, followed by contact of a heavy naphtha with the catalyst mixture. The light naphtha and heavy naphtha reaction zones may be operated at a catalyst to oil ratio (weight) in the range of from about 20 kg/kg to about 50 kg/kg, for example.

In some embodiments, the motive bed or transport reactor is operated in a fluidization regime sufficient to entrain the first cracking catalyst, and the second cracking catalyst with the hydrocarbon products recovered as an effluent from the secondary reactor overhead outlet. The effluent is then fed to a separator to separate the cracked hydrocarbon products and the first cracking catalyst from the second cracking catalyst.

The vapor/first cracking catalyst stream recovered from the separator may then be forwarded for separation. The second cracking catalyst recovered from the separator may be recycled back to the motive bed or transport reactor for continued reaction, as noted above.

The first effluent (cracked hydrocarbons and spent mixed catalyst from the riser reactor) and the second effluent (cracked hydrocarbons and separated first cracking catalyst from the motive bed or transport reactor) may both be fed to a disengagement vessel to separate the spent mixed catalyst fraction and the separated first cracking catalyst from the first and second cracked hydrocarbon products. The cracked hydrocarbon products, including light olefins, $C_4$ hydrocarbons, naphtha range hydrocarbons, and heavier hydrocarbons may then be separated to recover the desired products or product fractions.

Thus, processes disclosed herein integrate a catalyst-concentrating reactor, external solids separator, and a riser reactor, with common product separations and catalyst regeneration, where the catalysts used in the motive bed or transport reactor (the catalyst-concentrating reactor) is highly selective for cracking $C_4$ and naphtha range hydrocarbons to produce light olefins. The common catalyst regeneration provides for heat balance, and the common product separation (disengagement vessel, etc.) provides for simplicity of operations and reduced piece count, among other advantages.

Figure 6:
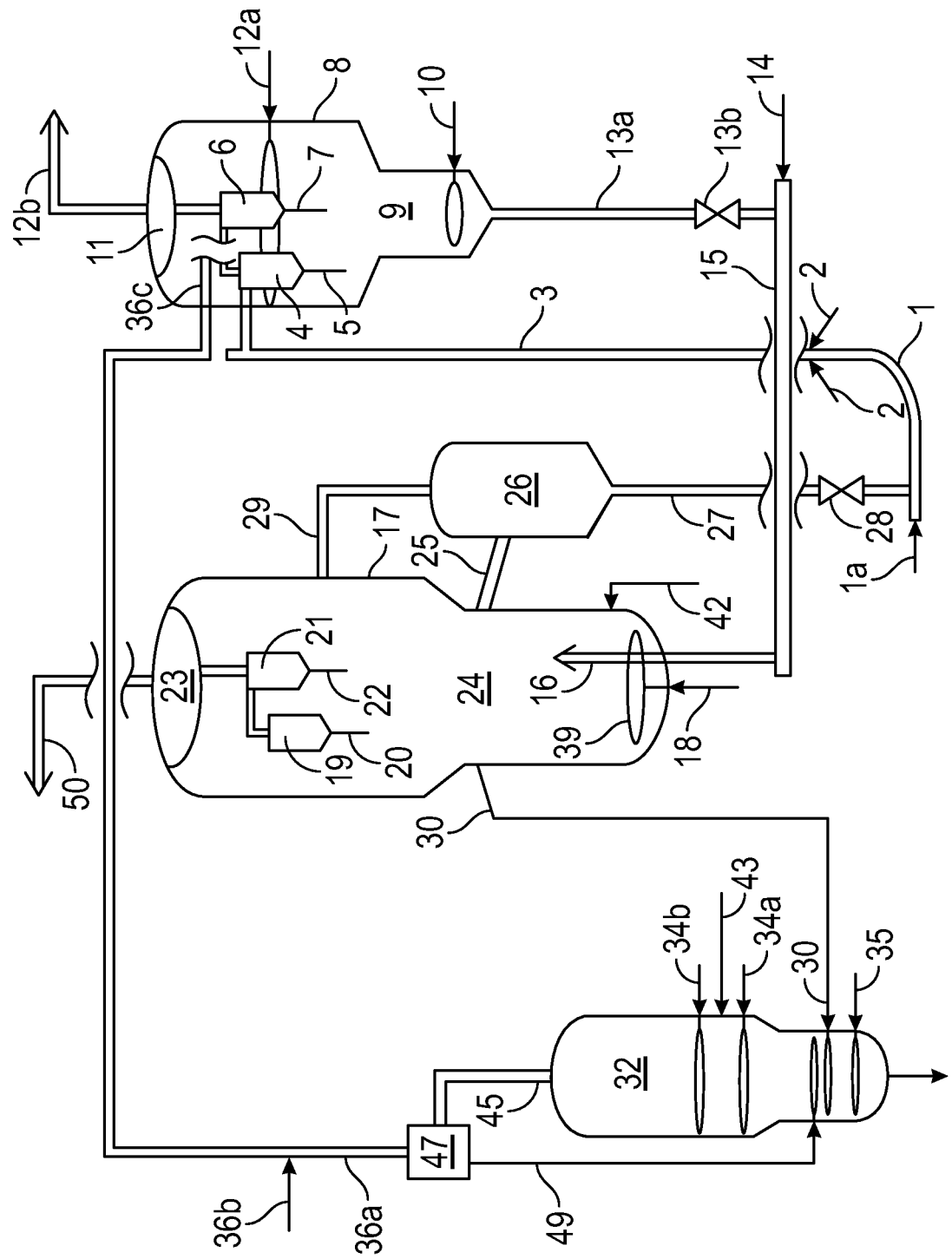
FIGS. 6-8 are simplified flow diagrams of processes according to embodiments herein.

The systems as illustrated in FIGS. 1A-1C may thus be advantageously associated with a riser reactor and regenerator system, such as illustrated in FIG. 6.

Referring now to FIG. 6, a simplified process flow diagram of systems for cracking hydrocarbons and producing light olefins according to embodiments disclosed herein is illustrated. The system includes a two-reactor configuration for maximizing yield of propylene and ethylene from petroleum residue feedstocks or other hydrocarbon streams. The first reactor 3 may be a riser reactor for cracking heavier hydrocarbon feeds, for example. The second reactor 32 is a motive bed or transport reactor, which may be equipped with baffles or internals. Light naphtha and heavy naphtha products from the first reactor 3 or similar feed streams from external sources may be processed in the second reactor 32 to enhance the yield of light olefins, including propylene and ethylene, and aromatics/high octane gasoline.

A heavy petroleum residue feed is injected through one or more feed injectors 2 located near the bottom of first reactor 3. The heavy petroleum feed contacts hot regenerated catalyst introduced through a J-bend 1. The catalyst fed to the first reactor 3 is a catalyst mixture, including a first catalyst selective for cracking heavier hydrocarbons, such as a Y-type zeolite based catalyst, and a second catalyst selective for the cracking of $C_4$ and naphtha range hydrocarbons for the production of light olefins, such as a ZSM-5 or ZSM-11, which may also be used in combination with other catalysts. The first and second catalysts may be different in one or both particle size and density. A first catalyst, such as the Y-type based zeolite, may have a particle size in the range of 20-200 microns and an apparent bulk density in the range of 0.60-1.0 g/ml. A second catalyst, such as ZSM-5 or ZSM-11, may have a particle size in the range of 20-350 microns and an apparent bulk density in the range of 0.7-1.2 g/ml.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17. The pressure in first reactor 3 is typically in the range from about 1 barg to about 5 barg.

After the major part of the cracking reaction is completed, the mixture of products, unconverted feed vapors, and spent catalyst flow into a two stage cyclone system housed in cyclone containment vessel 8. The two-stage cyclone system may include a primary cyclone 4, for separating spent catalyst from vapors. The spent catalyst is discharged into stripper 9 through primary cyclone dip leg 5. Fine catalyst particles entrained with the separated vapors from primary cyclone 4 and product vapors from second reactor 32, introduced via flow line 36a and a single stage cyclone 36c, are separated in second stage cyclone 6. The catalyst mixture collected is discharged into stripper 9 via dip leg 7. The vapors from second stage cyclone 6 are vented through a secondary cyclone outlet 12b, which may be connected to plenum 11, and are then routed to a main fractionator/gas plant (not shown) for recovery of products, including the desired olefins. If necessary, the product vapors are further cooled by introducing light cycle oil (LCO) or steam via distributor line 12a as a quench media.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor 10. The spent catalyst is then transferred to regenerator 17 via the spent catalyst standpipe 13a and lift line 15. Spent catalyst slide valve 13b, located on spent catalyst standpipe 13a is used for controlling catalyst flow from stripper 9 to regenerator 17. A small portion of combustion air or nitrogen may be introduced through a distributor 14 to help smooth transfer of spent catalyst.

Coked or spent catalyst is discharged through spent catalyst distributor 16 in the center of the dense regenerator bed 24. Combustion air is introduced by an air distributor 18 located at the bottom of regenerator bed 24. Coke deposited on the catalyst is then burned off in regenerator 17 via reaction with the combustion air. Regenerator 17, for example, may operate at a temperature in the range from about 640° C. to about 750° C. and a pressure in the range from about 1 barg to about 5 barg. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 50 via regenerator plenum 23 for downstream waste heat recovery and/or power recovery.

A first part of the regenerated catalyst mixture is withdrawn via regenerated catalyst standpipe 27, which is in flow communication with J bend 1. The catalyst flow from regenerator 17 to reactor 3 may be regulated by a slide valve 28 located on regenerated catalyst standpipe 27. The opening of slide valve 28 is adjusted to control the catalyst flow to maintain a desired top temperature in reactor 3.

In addition to lift steam, a provision may also be made to inject feed streams such as $C_4$ olefins and naphtha or similar external streams as a lift media to J bend 1 through a gas distributor 1a located at the Y-section for enabling smooth transfer of regenerated catalyst from J bend 1 to reactor 3. J bend 1 may also act as a dense bed reactor for cracking $C_4$ olefins and naphtha streams into light olefins at conditions favorable for such reactions, such as a WHSV of 0.5 to 50 $h^{-1}$, a temperature of 640° C. to 750° C., and residence times from 3 to 10 seconds.

A second part of the regenerated catalyst mixture is withdrawn into a second reactor 32 through a standpipe 30. A slide valve 31 may be used to control the catalyst flow from regenerator 17 to second reactor 32 based on a vapor outlet temperature set point. Light and heavy naphtha streams are injected into the bottom section of the catalyst bed through one or more feed distributors 34 (34a, 34b), either in liquid or vapor phase. As described above, second reactor 32 operates as a motive or transport bed reactor, where a portion of the regenerated catalyst mixture and the feed hydrocarbon streams flows upward (from the bottom to the top of the reactor bed) and are recovered as an effluent via flow line 45.

Second reactor 32 may be equipped with baffles or structured internals (not shown) that help intimate contact and mixing of catalyst and feed molecules. These internals may also help in minimizing channeling, bubble growth, and/or coalescence. Second reactor 32 may also be enlarged at different sections along the length to maintain a constant or desired superficial gas velocity within the sections. In addition to the hydrocarbon feed/products, steam, nitrogen, or other gases, such as methane, may be introduced as a fluidizing media through distributor 35.

As noted above, second reactor 32 utilizes two different catalysts that may differ in one or both of particle size and density, such as a lighter and smaller Y-type zeolite or FCC catalyst and a larger and/or denser ZSM-5/ZSM-11 shape-selective pentacil small pore zeolite. The superficial gas velocity in second reactor 32 is maintained such that essentially all or a large portion of the lighter, smaller catalyst (e.g., Y-type zeolite/FCC catalyst) and a portion of the heavier, larger catalyst (e.g., ZSM-5/ZSM-11) is carried out of the reactor with the cracked hydrocarbons and steam recovered via flow line 45. A portion of the larger and/or denser catalyst may be retained within the reactor 32, forming a dense bed toward the lower portion of the reactor, as noted above.

The effluent from reactor 32 recovered via flow line 45 may thus include cracked hydrocarbon products, unreacted hydrocarbon feedstock, steam (stripping media), and a catalyst mixture, including essentially all of the lighter and/or smaller catalyst and a portion of the larger and/or more-dense catalyst introduced to the reactor. The effluent may then be transported via flow line 45 to a solids separator 47. Separator 47 may be a separator configured to separate the two types of catalyst based on their physical properties, namely particle size and/or density. For example, separator 47 may use differences in inertial forces or centrifugal forces to separate FCC catalyst from the ZSM-5. The solids separation vessel 47 is an external vessel to the second reactor 32 and is operated at hydrodynamic properties that enhance the separation of the two types of catalyst based on their physical properties.

After separation in separator 47, the smaller and/or lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned via flow line 49 to the mixed flow reactor 32 for continued reaction with hydrocarbon feeds introduced through distributors 34.

Entrainment of essentially all of the lighter/smaller catalyst and a portion or all of the larger and/or more-dense catalyst, subsequent separations, and return of the larger and/or denser catalyst to reactor 32 may allow for a significant accumulation of the larger and/or denser catalyst in reactor 32. As this catalyst is more selective for the cracking of $C_4$ and naphtha range hydrocarbons, the accumulation of the larger and/or denser catalyst may provide a selectivity and yield advantage. Further, operation of the reactor in a motive bed or transport flow regime to entrain both types of catalyst may provide for improved operability of the reactor or flexibility in operations, as discussed above.

A hydrocarbon feed such as heavy vacuum gas oil or heavy residue feed, light cycle oil (LCO), or steam may be injected as a quench media in the outlet line 36a through a distributor 36b. The flow rate of such quench media may be controlled by setting the temperature of the stream entering the containment vessel 8. All the vapors from second reactor 32, including those fed through distributor 36b and/or introduced into separator 47, are discharged into the dilute phase of containment vessel 8 through a single stage cyclone 36c. Employing a hydrocarbon feed as a quench media is preferred as it serves dual purpose of cooling the products from second reactor 32 and also enhances the production of middle distillates.

The first stage reactor 3, such as a riser reactor, may operate in the fast fluidization regime (e.g., at a gas superficial velocity in the range from about 3 to about 10 m/s at the bottom section) and pneumatic transport regime (e.g., at a gas superficial velocity in the range from about 10 to about 20 m/s) in the top section.

WHSV in second reactor 32 is typically in the range from about 0.5 $h^{-1}$ to about 50 $h^{-1}$; vapor and catalyst residence times may vary from about 2 to about 20 seconds. When different feeds are introduced, preferably the $C_4$ feed is injected at an elevation below light naphtha feed injection, and the light naphtha feed injection is at an elevation below the heavy naphtha feed injection. Where used, a medium naphtha feed injection would be intermediate the elevation of the light and heavy naphtha elevations.

As necessary, make-up catalyst may be introduced via one or more flow lines 42, 43. For example, fresh or make-up FCC or Y-type zeolite catalyst or a mixture of these two may be introduced to regenerator 17 via flow line 42 and fresh or make-up ZSM-5/ZSM-11 catalyst may be introduced to second reactor 32 via flow line 43. Overall system catalyst inventory may be maintained by withdrawing mixed catalyst from regenerator 24, for example. Catalyst inventory and accumulation of the preferred catalyst within reactor 32 may be controlled, as will be described below, via control of the reactor and separator 47 operations.

In some embodiments, a first part of the regenerated catalyst is withdrawn from regenerator 17 into a Regenerated Catalyst (RCSP) hopper 26 via withdrawal line 25, which is in flow communication with regenerator 17 and regenerated catalyst standpipe 27. The catalyst bed in the RCSP hopper 26 floats with regenerator 17 bed level. The regenerated catalyst is then transferred from RCSP hopper 26 to reactor 3 via regenerated catalyst standpipe 27, which is in flow communication with J bend 1. The catalyst flow from regenerator 17 to reactor 3 may be regulated by a RCSP slide valve 28 located on regenerated catalyst standpipe 27. A pressure equalization line 29 may also be provided. A similar feed system may also be used to provide catalyst to the second reactor 32.

A separator bypass line 60 may also be used to facilitate the transfer of particles from the top of reactor 32 to the vessel 8, such as illustrated in FIG. 1. As described with respect to FIG. 1 above, second reactor 32 utilizes two different catalysts that may differ in one or both of particle size and density, such as a lighter and/or smaller Y-type zeolite or FCC catalyst and a larger and/or denser ZSM-5/ZSM-11 shape-selective pentacil small pore zeolite. The superficial gas velocity in second reactor 32 may be maintained such that essentially all of the lighter, smaller catalyst (e.g., Y-type zeolite/FCC catalyst) and a portion of larger and/or more-dense catalyst (e.g., ZSM-5/ZSM-11) is carried out of the reactor with the cracked hydrocarbons and steam recovered via flow line 45.

The effluent from reactor 32 recovered via flow line 45 may thus include cracked hydrocarbon products, unreacted hydrocarbon feedstock, steam (stripping media), and a catalyst mixture, including essentially all of the lighter, smaller catalyst and a portion of the larger and/or more-dense catalyst introduced to the reactor. The effluent may then be transported via flow line 45 to a solids separator 47. Separator 47 may be a separator configured to separate the two types of catalyst based on their physical properties, namely particle size and/or density. The separator 47 is operated at hydrodynamic properties that enhance the separation of the two types of catalyst based on their physical properties.

After separation in separator 47, the smaller/lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned to the mixed flow reactor 32 for continued reaction with hydrocarbon feeds introduced through distributors 34.

Continuously or intermittently, a portion of the effluent containing both types of catalysts being transported via flow line 45 may be diverted to bypass separator 47. The diverted portion of the effluent may flow around separator 47 via flow line 60, which may include a diverter or flow control valve 62. The effluent may then continue via flow line 64 back to disengager 8 for separation of the hydrocarbon products from the catalysts. Flow line 64 may be combined with the effluent and smaller catalyst recovered from separator 47 via flow line 36a, and may be introduced either upstream or downstream of quench 36b. Alternatively, the diverted effluent in line 60 may be fed directly to disengager/containment vessel 8.

While illustrated in FIG. 6 with a diverter valve 62, embodiments herein contemplate use of y-shaped flow conduit or similar apparatus to continuously send a portion of the effluent, containing both catalyst particle types, to disengager 8, while continuously sending a portion of the effluent to separator 47, thus allowing for the desired accumulation of the larger and/or denser catalyst particles within reactor 32. As depicted in FIG. 1, the catalyst from second reactor can also be transferred via line 37, slide valve 38 and transfer line 40 to the regenerator 17. The blower air is used as carrier gas 39 to transfer the catalyst to regenerator 17. Such catalyst transfer facility will not only help in controlling the catalyst bed level in reactor 32 but also help in more frequent catalyst regeneration. The use of increased flow of carrier fluid and/or the use of a flow diverter, as described above, may beneficially provide for the accumulation of the catalyst selective for cracking naphtha range hydrocarbons in the second reactor, reactor 32.

Embodiments disclosed herein, by the methods described above, significantly increase the concentration of desired catalysts in the secondary reactor (motive bed or transport reactor vessel 32), consequently increasing light olefin yield. In addition, this process also serves as a method to decouple the withdrawal and addition of the ZSM-5 and ZSM5-11 with the withdrawal and addition of FCC catalyst. In summary, the FCC process presented in this disclosure creates a desired ZSM-5 or ZSM-11 catalyst additive rich environment in the secondary reactor 32, which could preferentially convert light and heavy naphtha products, such as those derived from primary reactor, to improve light olefin yield, while simultaneously maximizing middle distillate yield, by applying optimum operation condition in the primary reactor or riser.

Another benefit of embodiments disclosed herein is that the integrated two-reactor scheme overcomes the heat balance limitations in the stand alone $C_4$/naphtha catalytic cracking processes. The secondary (mixed flow) reactor acts as a heat sink due to integration with the catalyst regenerator, minimizing the requirement of catalyst cooler while processing residue feed stocks.

The product vapors from the secondary reactor are transported into the first stage reactor/disengaging vessel or reaction termination device wherein these vapors are mixed and quenched with the products from the first stage and or external quench media such as LCO or steam to minimize the unwanted thermal cracking reactions.

Alternatively, the product outlet line of the motive bed or transport reactor/solids separator can also be used to introduce additional quantity of heavy feed or re-route part of the feed from the first stage reactor (the riser reactor). This serves two purposes: (1) the catalyst in the solids separator vapor outlet line is predominantly Y-type zeolite/conventional FCC catalyst that is preferred to crack these heavy feed molecules into middle distillates, and (2) such cracking reaction is endothermic that helps in reducing the temperature of the outgoing product vapors and also residence time.

The reactor system described above with respect to FIG. 6 relates primarily to light olefins production, and advantageous concentration of a catalyst in a mixed catalyst system to enhance reactivity and selectivity of the system. Such a reactor system may also be used for other mixed catalyst systems, where concentration of one of the catalysts may be advantageous. For example, in some embodiments, the reaction system may be used for gasoline desulfurization, where catalyst mixture may include a smaller and/or less dense FCC catalyst, such as zeolite Y, and a larger and/or denser catalyst, such as a gasoline desulfurization additive.

In general, the process flow diagrams illustrated in FIGS. 1 and 6 use the catalyst/particle separation technology to process additional or recycle hydrocarbon feedstocks in a secondary vessel. The catalyst mixture circulating through the system may include catalysts selective to particular reactions, such as cracking, desulfurization, demetalization, denitrogenation, and other, where the catalysts of the mixture are selected to have differing physical properties, as described above, such that a desired catalyst may be concentrated in the secondary reactor. Regenerated catalyst is fed to the secondary motive bed or transport reactor/vessel which may operate in fast fluidized, bubbling, or turbulent bed operation (depending on application). The effluent of the secondary reactor/vessel goes to the separator 47, where the primary and secondary catalysts are separated based on size and/or density and the separator bottoms, which is enriched in the secondary catalyst, is recycled back to the secondary reactor/vessel. The secondary reactor/vessel has optional catalyst withdrawals which may be advantageous depending on application as well as different hydrocarbon feeds depending on application. The concentration of the secondary catalyst may enhance the operability, flexibility, and selectivity of the overall reaction system.

The hydrocarbon products recovered from disengagement vessel 8/stripper 9 may be forwarded, as described above, to a fractionator/gas plant, for separation and recovery of one or more hydrocarbon fractions. One or more of the recovered hydrocarbon fractions from the fractionator/gas plant in embodiments herein may be recirculated to the riser reactor 3 or secondary motive bed or transport reactor 32 for further processing, such as illustrated in FIGS. 7 and 8.

a simplified process flow diagram of systems for processing hydrocarbons according to embodiments disclosed herein is illustrated, where like numerals represent like parts. After the major part of the cracking reaction is completed, the mixture of products, unconverted feed vapors, and spent catalyst flow into a two stage cyclone system housed in cyclone containment vessel 8. The catalyst mixture collected is discharged into stripper 9. The vapors from separator 8 are vented through a secondary cyclone outlet 12b, and are then routed to a fractionator/gas plant 110 for recovery of products, including the desired olefins.

The fractionator 110 may be, for example, a main fractionator of an FCC plant, and may produce various hydrocarbon fractions, including a light olefin-containing fraction 112, a light naphtha fraction 114, a heavy naphtha fraction 116, and a heavies fraction 118, among other various hydrocarbon cuts. The products routed to fractionator/gas plant 110 may include other light gases, such as steam and hydrogen sulfide that may be produced during desulfurization; separators, absorbers, or other unit operations may be included where such impurities are desired to be separated upstream or downstream of the main fractionator/gas plant.

Figure 7:
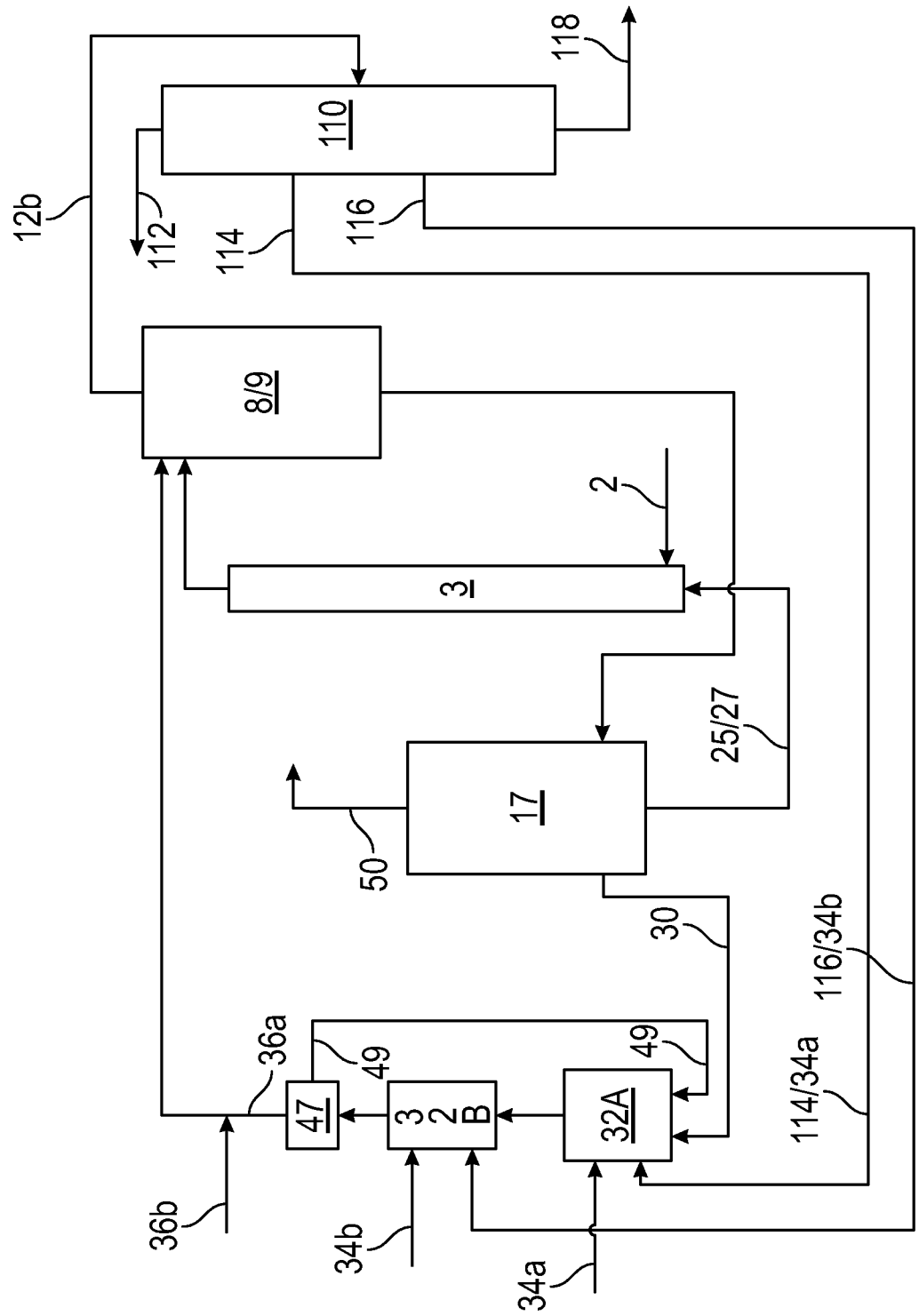
Figure 8:
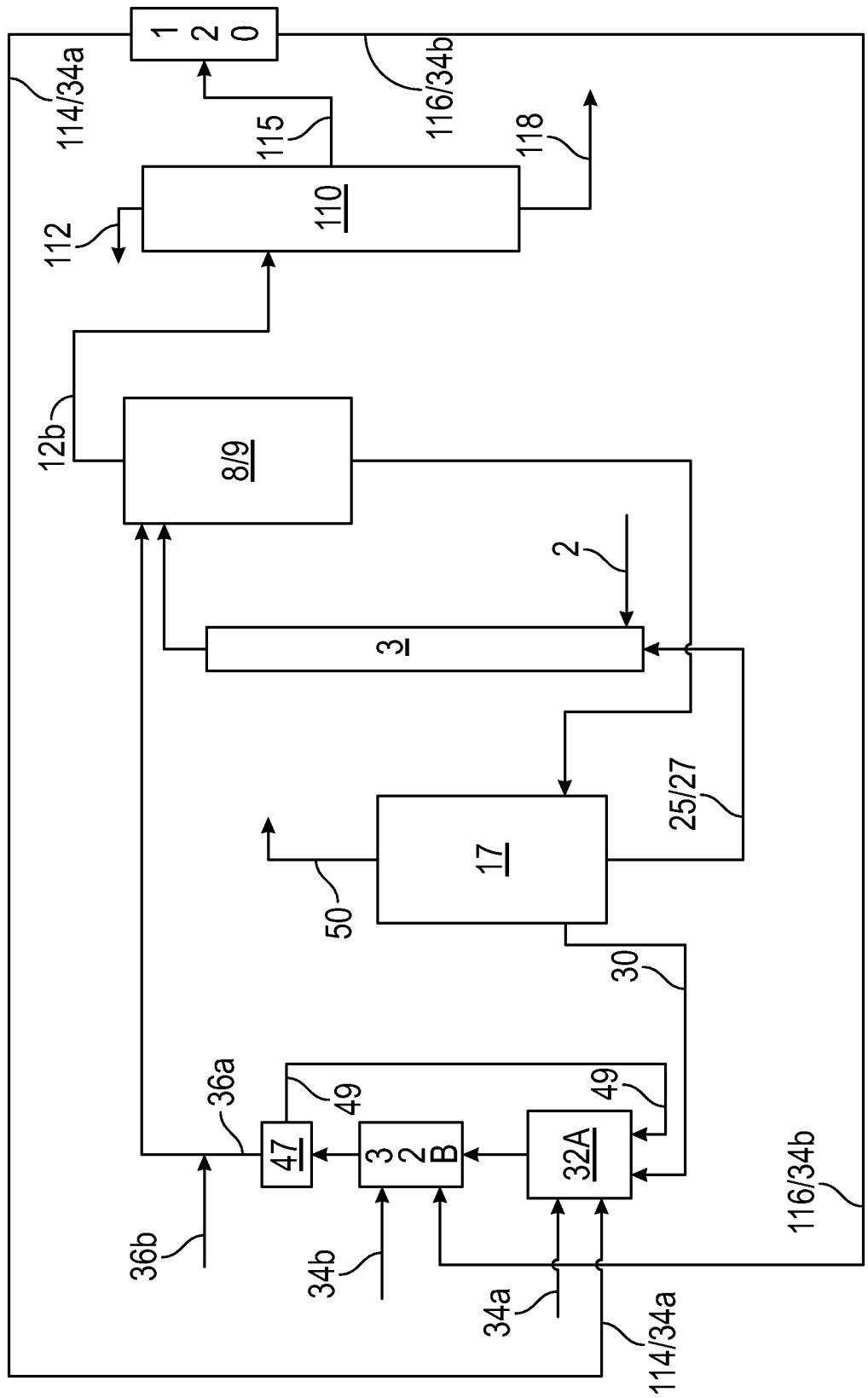

As illustrated in FIG. 7, the light naphtha fraction 114 may be routed to the first stage or lowermost reaction stage of catalyst-concentrating reactor 32 (32A). The heavy naphtha fraction may be routed to the second stage or uppermost reaction stage of catalyst-concentrating reactor 32 (32B). If desired, additional light naphtha 34a and heavy naphtha 34b from additional sources may also be fed to the appropriate reaction stages. Alternatively, the fractions 114, 116 may be used as feeds 34a, 34b, respectively.

As illustrated in FIG. 8, the fractionator 110 may produce various hydrocarbon fractions, including a light olefin-containing fraction 112, a naphtha fraction 115, and a heavies fraction 118, among other various hydrocarbon cuts. The naphtha fraction 115 may then be further separated in a fractionator 120 into light naphtha fraction 34a and heavy naphtha fraction 34b, which may be further processed in catalyst-concentrating reactor 32 as described above.

Embodiments herein may utilize various types of catalysts or particles to perform desired reactions, where a common regenerator may be used to regenerate the mixture of catalysts, and a separator is advantageously located to enrich one or more reactors with a particular catalyst contained in the mixture of catalysts. Embodiments herein may be used to improve unit operations, and enhance the selectivity and flexibility of the reaction systems, such as for applications including light olefins production, gasoline desulfurization, and heavy oil processing.

Light olefins production may include various light, medium, and heavy hydrocarbon feeds to the riser, as described above. Feeds to the second reactor 32 may include naphtha, such as straight run naphtha or recycle cat naphtha, among other feeds, and the naphtha may be advantageously split so as to provide contact of the light naphtha and heavy naphtha at beneficial reaction conditions to enhance olefins production and decrease light gas production. The catalyst mixture for light olefins production may include a smaller and/or less dense catalyst, such as an FCC catalyst (zeolite Y, for example), and a heavier/denser catalyst, such as ZSM-5 or ZSM-11, among other combinations. Other cracking catalysts may also be used Various catalysts for the cracking of hydrocarbons are disclosed in U.S. Pat. Nos. 7,375,257, 7,314,963, 7,268,265, 7,087,155, 6,358,486, 6,930,219, 6,809,055, 5,972,205, 5,702,589, 5,637,207, 5,534,135, and 5,314,610, among others.

Embodiments herein describe the catalyst mixture being separated by the separator, the effective concentration of a preferential catalyst within the mixture in a reactor, as well as the control of temperature for initial contact of the regenerated catalyst with the reactants. Embodiments herein provide a novel fluid catalytic cracking process for upgrading a naphtha range material utilizing a catalyst-concentrating concept that additionally achieves a uniform catalyst temperature upstream of reactant contact. As described above, there are two different catalyst and/or additives with different particle sizes and/or density for different functions sharing a common regenerator. It is understood that the FCC catalyst system will most likely employ more than two types of catalyst/additives; however, the effective catalyst/additive will have the physical properties as described previously. Furthermore, a solids separation vessel as described above may be used to selectively return a portion of the FCC catalyst and/or additive based on its size and/or density to create a relatively high concentration of the desired catalyst and/or additive in the secondary reaction vessel, to enhance favorable reactions for that specific catalyst or additive.

Where specific naphtha range material is introduced at different points along the secondary reactor in order to benefit from the catalyst concentration effect as well as the inherent heat and material balance for optimized selectivity and productivity. Other processes exist which involve staging feeds along a reactor in a FCC system (U.S. Pat. Nos. 5,154,818, 7,029,571, for example); however, these processes do not specifically sub-divide the naphtha into separate streams, nor do they rely on a binary catalyst system. This subdivision of the naphtha feed along with a two catalyst system optimizes the selectivity to products based on the heat and material balance of the system.

Advantages of the present disclosure may be exemplified by the following. The first case study presented herein incorporates a blend of two different naphtha materials, the first is a light straight run (LSR) type material or a naphtha range material with the second material being a catalytic cracking derived naphtha. As processing of tight oils in refineries has increased in North America, there is a surplus of low octane value straight run type naphtha. It is desirable to upgrade this straight run naphtha via catalytic cracking to light olefins including propylene, ethylene and butylenes; however, processing of straight run naphtha requires higher reaction temperatures and longer catalyst contact times than conventional feedstocks processed in fluid catalytic cracking units. Co-processing straight run naphtha and operating in the conventional window of temperature and catalyst contact time generally limit the yield of the straight run naphtha processed in a conventional FCCU to marginal values. Co-processing a straight run naphtha at higher severity and contact time generally leads to high amounts of undesirable products such as dry gas and coke, making the overall FCC process less profitable, a higher severity is also generally outside of the design window for conventional FCC's and leads to large amounts of retrofits. The present process overcomes these limitations via the following paths:

a. Introducing a second reactor where the naphtha materials are processed which has the benefit of a higher concentration of an additive due to recycle of catalyst from the solids separation device.

b. Recycling of partially coked Y zeolite/FCC catalyst to limit undesirable side reactions, increasing reactor selectivity; while ZSM-5 may be the heavier/larger catalyst, and Y zeolite/FCC catalyst is the lighter/smaller catalyst in the mixed catalyst system, 100% classification cannot be achieved using solids separation devices and systems according to embodiments herein. It has, however, been found that the recycle solids, including partially coked Y zeolite/FCC catalyst, provides an unexpected selectivity benefit.

c. Introducing the lower reactive light straight-run naphtha at the bottom of the secondary reactor where the temperature is more optimal and catalyst contact is longest. The light straight run naphtha will generally be between 10 wt % and 75 wt % of the overall naphtha flow to the system to benefit from the heat balance.

d. Preventing excess temperature and dry gas make versus other processes at the same reactor outlet temperature via catalyst recycle from a solids separation device; this catalyst recycle makes the reactor more isothermal which benefits the selectivity of the process.

Figure 9:
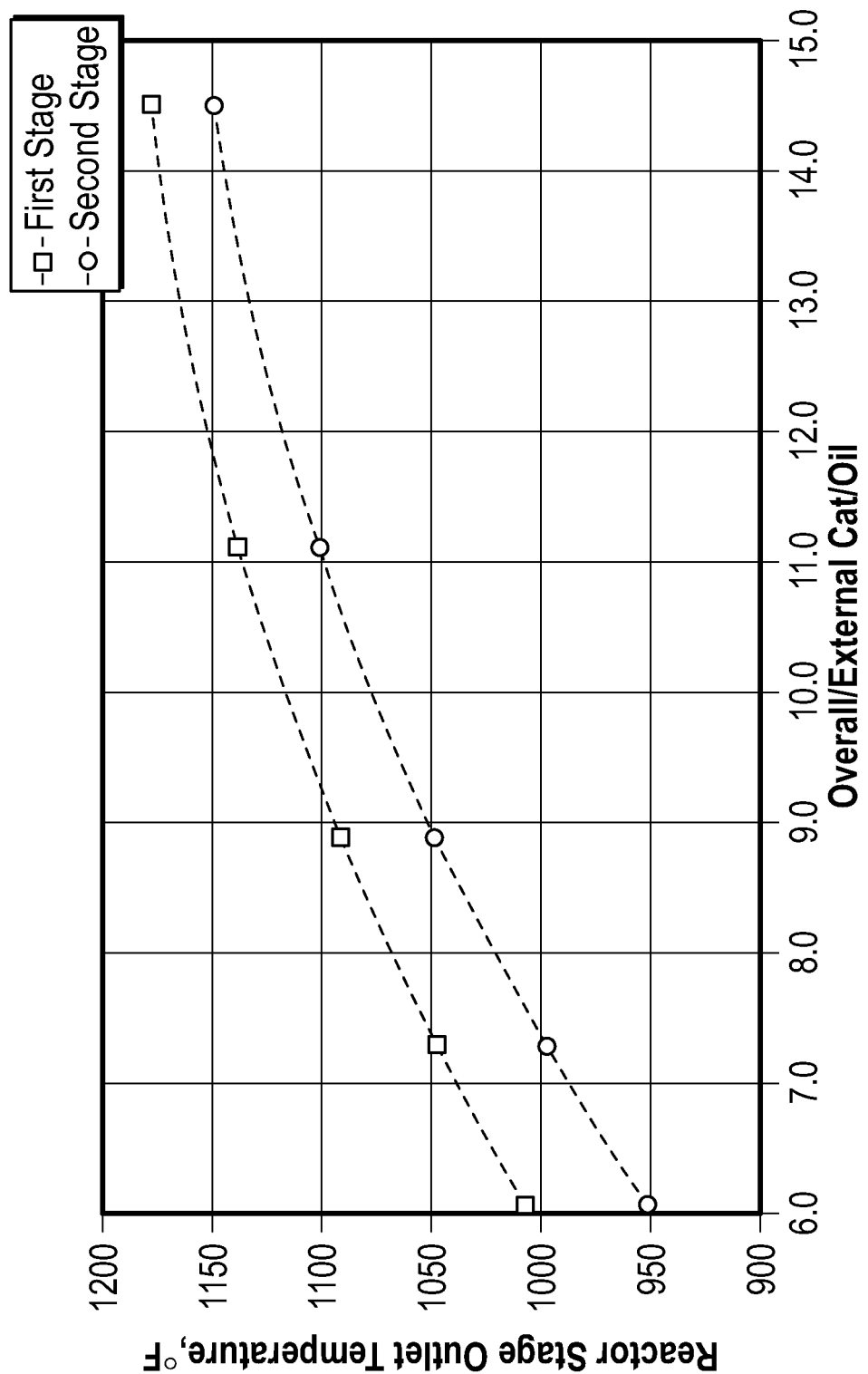
FIGS. 9-12 present data illustrating the advantageous reaction conditions attainable in reactor systems according to embodiments herein.

FIG. 9 shows the benefit of the staged naphtha processing scheme for different catalyst to oil ratios. The catalyst to oil ratio is defined here as the catalyst flow from the regenerator in order to achieve the second stage reactor outlet temperature. The first stage outlet temperature is the combination of the fresh regenerated catalyst, recycled partially spent catalyst and first stage naphtha feed. The figure is shown for a 50:50 weight blend of light straight run naphtha and cat naphtha and shows an approximately 50° F. higher temperature achieved in the first stage versus the second stage. This higher temperature is more isothermal due to the recycled catalyst from the catalyst particle separator; both of these effects will increase reaction rate and selectivity to light olefins.

Figure 10:
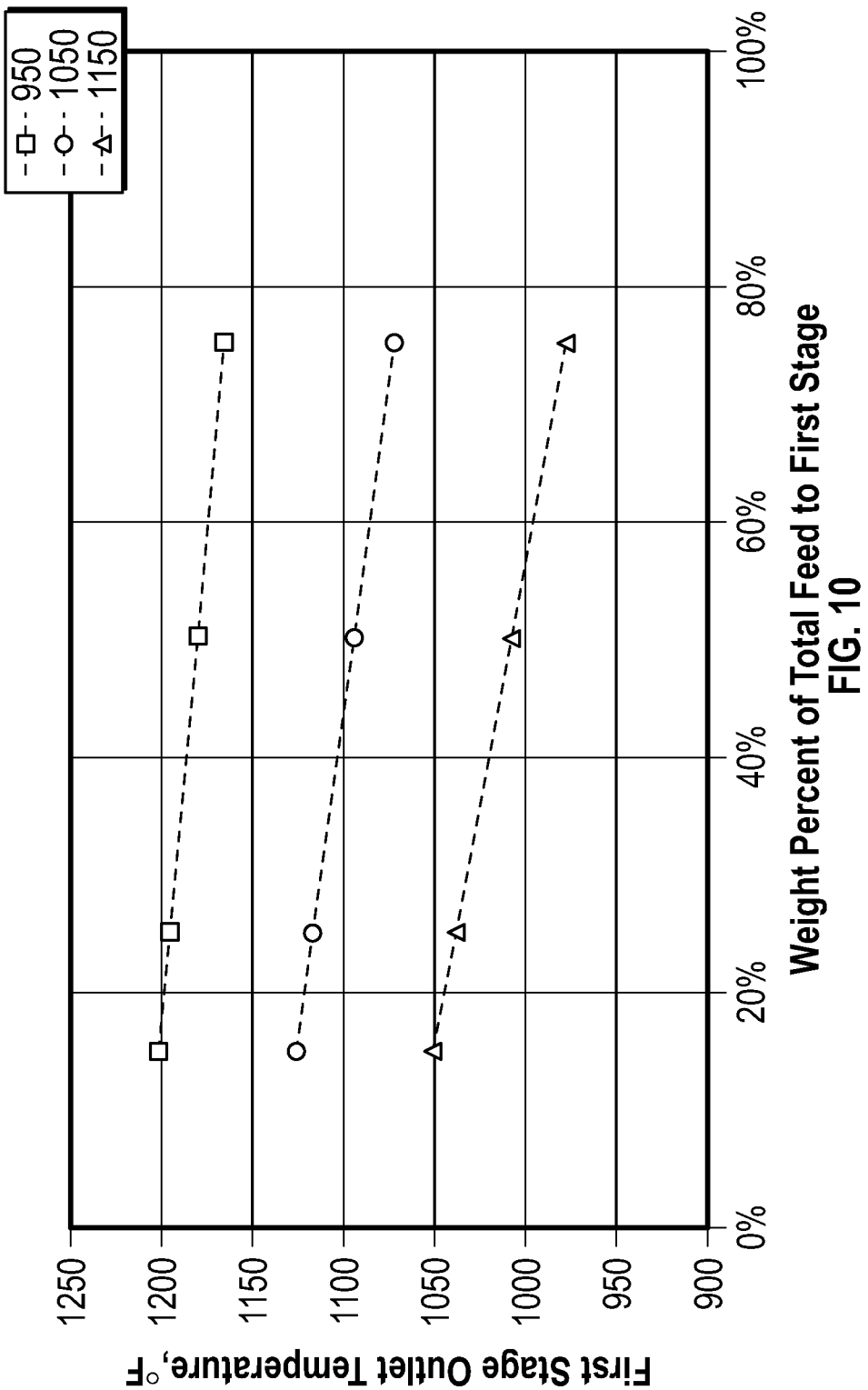

FIG. 10 shows the benefit of the staged naphtha scheme achieving a higher first stage outlet temperature at three different reactor outlet temperatures by varying the weight percent of feed to the first stage. This increase in first stage outlet temperature results in a much larger percentage of light straight run naphtha being able to be processed versus conventional processes.

The second case presented here involves separating a catalytic cracked-derived naphtha into a low boiling range material and a higher boiling range material. The lower boiling range material will be comprised of primarily $C_5$ hydrocarbons with some $C_4$ and $C_6$ hydrocarbons (roughly 30° F.-160° F. boiling point) present while the higher boiling range material will be comprised of 150° F.-430° F. range material. The lower boiling range material has an inherent lower activity for cracking on ZSM-5 type catalyst versus higher boiling range material and requires more severe operation in order to increase reactor yields; however, this high severity would be detrimental to the higher boiling fraction. As such, here we introduce the lower boiling range material at the bottom of the reactor where the reactor conditions are most severe (i.e., higher temperature and longer catalyst contact time), while the C6+ material is introduced at a later stage in the reactor. This process is advantageous because:

Generally, $C_5$ range material accounts for approximately 20 wt % of the full range light cat naphtha material; this amount of $C_5$ material introduced in the first stage allows for a high temperature difference between the first and second (overall) reactor outlet temperatures.

Figure 11:
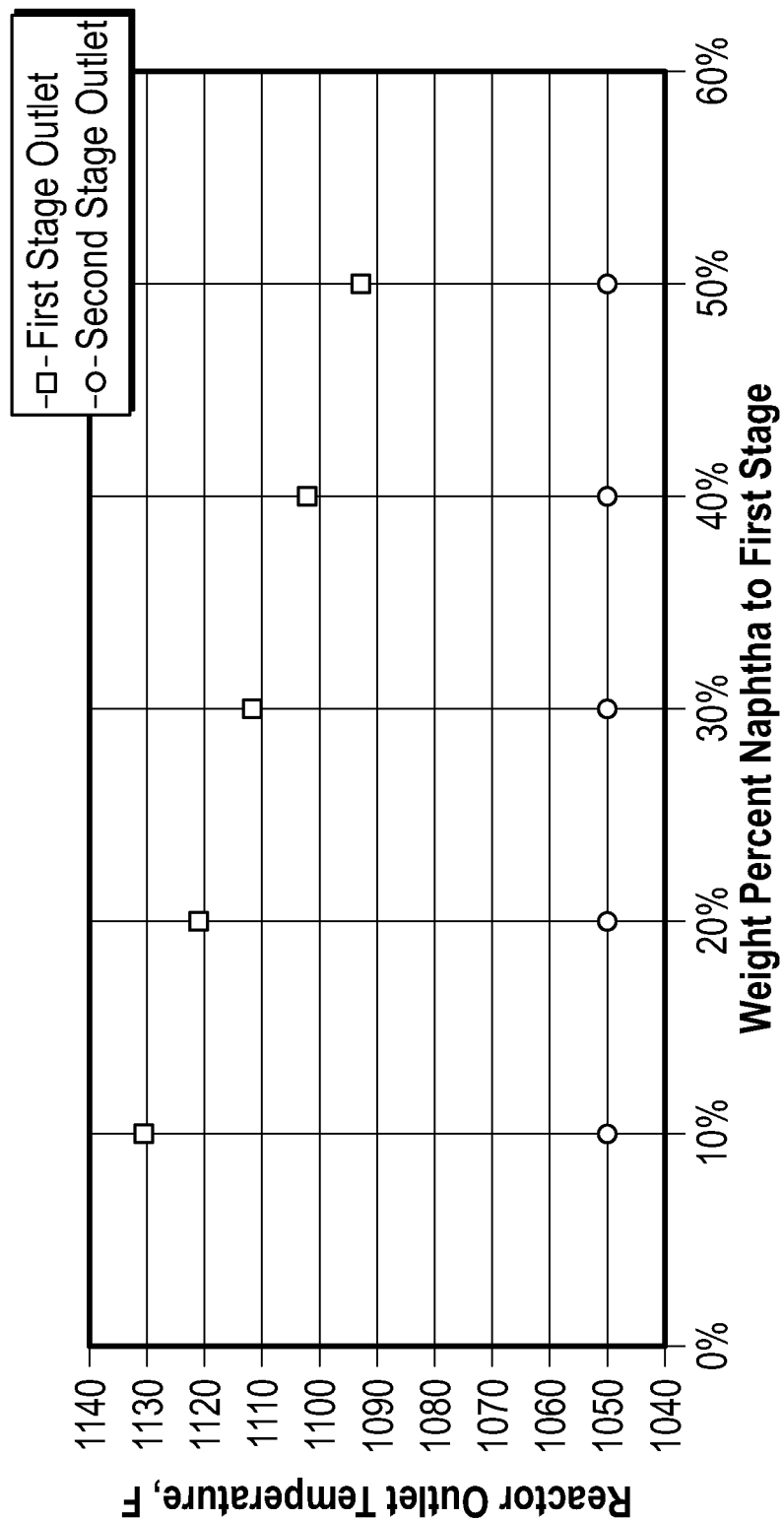

FIG. 11 shows the effect of different weight percent naphtha feed to the first stage of the reactor versus the overall at a constant second stage reactor outlet temperature. The first stage reactor is able to achieve temperatures 50° F. and higher versus the overall reactor outlet temperature.

Introducing the more reactive $C_{6+}$ naphtha after the first stage enhances the selectivity to light olefins and minimizes dry gas make as the highest temperature the naphtha is subjected to is in the first stage; and, with the catalyst particle separator and intimate mixing with the regenerated catalyst as described herein, this temperature is lower than that of a conventional riser reactor configuration.

Figure 12:
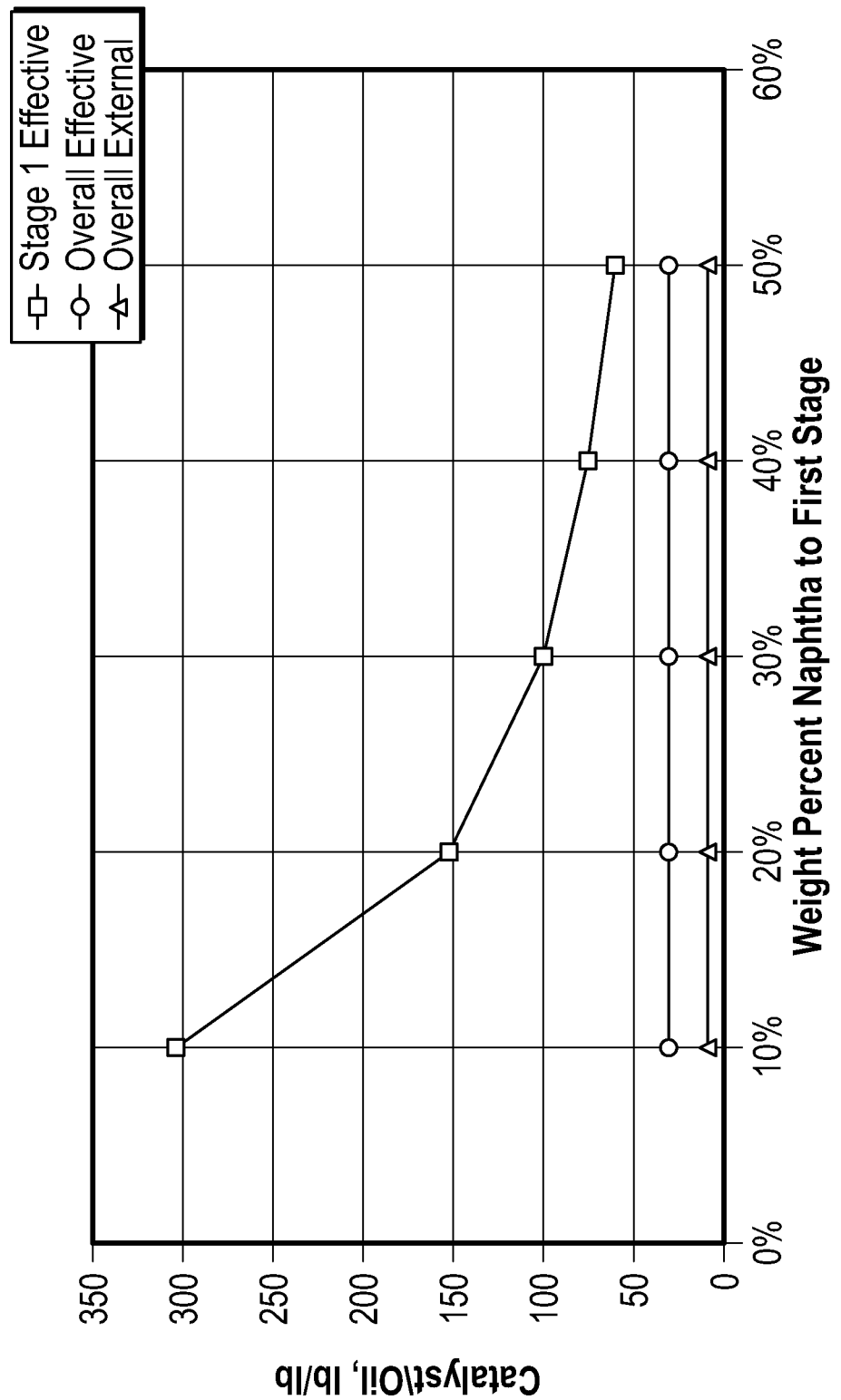

The $C_5$ material, in addition to a higher temperature, may require a longer catalyst contact time to increase reactor productivity; embodiments herein increase the catalyst contact time calculated by catalyst to oil ratio, as shown in FIG. 12.

Figure 13:
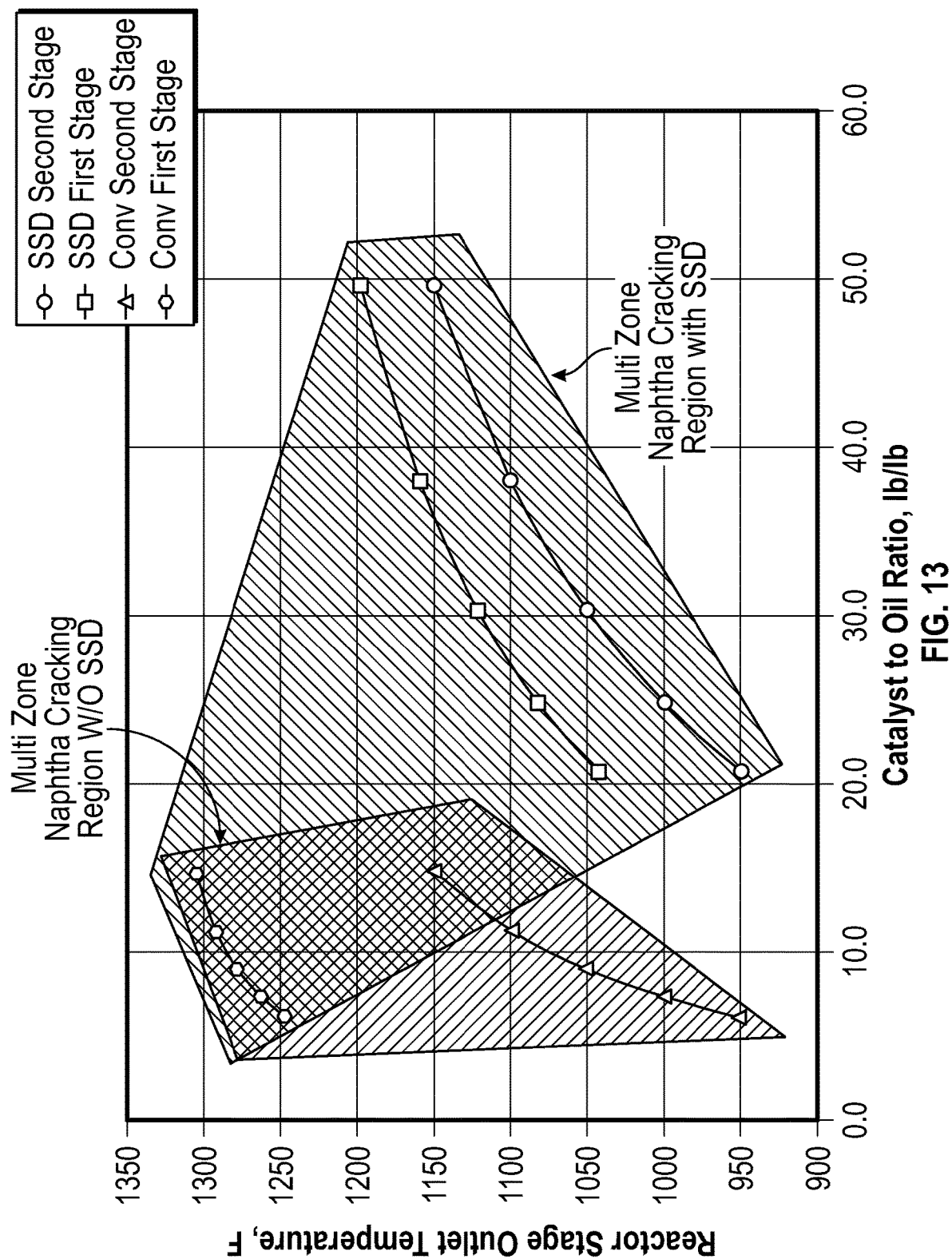
FIG. 13 presents data comparing reactor systems according to embodiments herein to conventional systems.

Referring now to FIG. 13, a conventional riser reactor operation is compared with operations in a catalyst-concentrating reactor as described herein, where the regenerator temperature is set at 1350° F. for each simulation. The operating windows for the first and second stages of a riser reactor are fairly narrow, at low catalyst to oil ratios and with relatively high temperatures in the first stage, which may produce more dry gas. In contrast, use of catalyst-concentrating reactors and uniform mixed catalyst temperatures achievable therein, the operating window for embodiments herein is wider, providing additional process flexibility, and at lower, more favorable conditions in the first reaction stage, thereby producing less dry gas than the conventional riser reactor system.

By introducing a solids separation device into systems according to embodiments herein, there is a significant increase in internal catalyst to oil ratio. In FIG. 13, for example, the Catalyst/Oil ratio of embodiments herein are approximately four times that of a conventional case. When the same flow rate of catalyst at the same regenerator temperature comes in from the Regenerator, the difference between the average temperature of the 1$^{st}$ and 2$^{nd}$ stages for embodiments herein is much smaller as compared to that of a conventional two stage system. This result is simply due to heat balance and higher internal catalyst to oil ratio provided by embodiments herein. The more uniform temperature profile (less temperature difference between two stages) provided by embodiments herein will lead to less overcracking and less dry gas production.

As described above, embodiments herein provide for advantageous processing of naphtha range hydrocarbons. A catalyst-concentrating reactor as described herein may beneficially provide a uniform catalyst temperature for initial contact with light naphtha, followed by contact of the catalyst mixture with heavy naphtha at more preferred temperatures. Thus, embodiments herein may provide for contact of reactants at more appropriate conditions, advantageously producing less dry gas and other byproducts.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for the conversion of hydrocarbons, comprising:
    separating an effluent from a moving bed reactor, the effluent being at a reactor outlet temperature and comprising a reaction product, a first particulate catalyst, and a second particulate catalyst, wherein the first particulate catalyst has a smaller average particle size and/or is less dense than the second particulate catalyst, to recover a first stream comprising the reaction product and the first particulate catalyst and a second stream comprising the second particulate catalyst;
    admixing the second stream comprising the second particulate catalyst with a regenerated catalyst stream, the regenerated catalyst stream comprising first particulate catalyst and second particulate catalyst at an elevated temperature, wherein the admixing produces a mixed catalyst at a temperature intermediate the elevated temperature and the reactor outlet temperature;
    contacting, in the moving bed reactor, the mixed catalyst and a light naphtha feedstock to react hydrocarbons therein, the endothermic reaction reducing a temperature of the mixed catalyst to a second intermediate temperature;
    contacting, in the moving bed reactor, the mixed catalyst at the second intermediate temperature and a heavy naphtha feedstock to react hydrocarbons therein;
    recovering from the moving bed reactor the effluent comprising the reaction product, the first particulate catalyst, and the second particulate catalyst.

2. The process of claim 1, wherein the moving bed reactor is a vertical reactor, and wherein the light naphtha feedstock is introduced to the reactor at a lower elevation than the heavy naphtha feedstock.

3. The process of claim 1, wherein:
    the elevated temperature is in the range from about 1300° F. to about 1500° F.;
    the first intermediate temperature is in the range from about 900° F. to about 1200° F.;
    the second intermediate temperature is in the range from about 800° F. to about 1150° F.; and
    the reactor effluent temperature is in the range from about 700° F. to about 1150° F.

4. The process of claim 1, wherein the admixing is performed in the moving bed reactor at an elevation below an elevation at which the light naphtha feedstock is introduced.

5. The process of claim 1, wherein the admixing is performed external to the moving bed reactor.

6. A system for performing chemical reactions, comprising:
    a separator configured to separate a reactor effluent comprising a reaction product, a first particulate catalyst, and a second particulate catalyst, wherein the first particulate catalyst has a smaller average particle size and/or is less dense than the second particulate catalyst, to recover a first stream, comprising the reaction product and the first particulate catalyst, and a second stream, comprising the second particulate catalyst;
    a mixing device configured to intimately contact the second stream comprising the second particulate catalyst with a catalyst stream, the catalyst stream comprising first particulate catalyst and second particulate catalyst at an elevated temperature, wherein the intimately contacting produces a mixed catalyst at a uniform temperature intermediate the elevated temperature and the reactor outlet temperature, wherein the mixing devise comprises a standpipe comprising:
        a first inlet to receive the second stream from the separator;
        a second inlet to receive the catalyst stream from a catalyst regenerator; and
        an outlet to supply the mixed catalyst to the moving bed reactor;
    a moving bed reactor configured to:
        contact the mixed catalyst with a first reactant at the intermediate temperature, reducing a temperature of the mixed catalyst to a second intermediate temperature;
        contact the mixed catalyst at the second intermediate temperature with a second reactant;
    a flow stream configured to recover the reactor effluent from the moving bed reactor.

7. A system for performing chemical reactions, comprising:
    a separator configured to separate a reactor effluent comprising a reaction product, a first particulate catalyst, and a second particulate catalyst, wherein the first particulate catalyst has a smaller average particle size and/or is less dense than the second particulate catalyst, to recover a first stream, comprising the reaction product and the first particulate catalyst, and a second stream, comprising the second particulate catalyst;
    a mixing device configured to intimately contact the second stream comprising the second particulate catalyst with a catalyst stream, the catalyst stream comprising first particulate catalyst and second particulate catalyst at an elevated temperature, wherein the intimately contacting produces a mixed catalyst at a uniform temperature intermediate the elevated temperature and the reactor outlet temperature, wherein the mixing device comprises:
        a first catalyst distributor disposed in a lower portion of the moving bed reactor, the catalyst distributor configured to receive the second stream from the separator and to disperse the second catalyst contained in the second stream into the moving bed reactor;
        a second catalyst distributor disposed proximate the first catalyst distributor configured to receive the catalyst stream from the catalyst regenerator and to disperse the first and second catalysts contained in the catalyst stream into the moving bed reactor and into contact with the second catalyst from the first catalyst distributor;

a moving bed reactor configured to:
contact the mixed catalyst with a first reactant at the intermediate temperature, reducing a temperature of the mixed catalyst to a second intermediate temperature;
contact the mixed catalyst at the second intermediate temperature with a second reactant;
a flow stream configured to recover the reactor effluent from the moving bed reactor.

8. The system of claim 7, further comprising a gas distributor positioned below the first and second catalyst distributors configured to fluidize and intimately mix the catalysts to attain the uniform intermediate temperature prior to contact with the first reactant.

9. The system of claim 7, further comprising structure internal to the moving bed reactor and located below a feed elevation of the first reactant to enhance contact of the catalysts to attain the uniform intermediate temperature prior to contact with the first reactant.

10. A process for the conversion of hydrocarbons, comprising:
feeding a catalyst stream comprising a first particulate catalyst and a second particulate catalyst to a reactor, wherein the first particulate catalyst has a smaller average particle size and/or is less dense than the second particulate catalyst and admixing the catalyst stream with a second catalyst stream, comprising second particulate catalyst, to provide a mixed catalyst having a uniform temperature in the range from about 900° F. to about 1250° F.;
feeding a light naphtha feedstock and a heavy naphtha feedstock to the reactor, wherein the light naphtha feedstock is introduced to the reactor at a lower elevation than the heavy naphtha feedstock;
contacting the light and heavy naphtha feedstocks with the mixed catalysts to react hydrocarbons contained therein;
recovering an overhead product from the reactor comprising a converted hydrocarbon effluent, the second particulate catalyst, and the first particulate catalyst;
separating the second particulate catalyst from the overhead product to provide a first stream comprising the first particulate catalyst and the converted hydrocarbon effluent and the second catalyst stream, comprising the separated second particulate catalyst;
returning the separated second particulate catalyst in the second stream to the reactor.

11. The process of claim 10, wherein:
the catalyst stream is at a temperature in the range from about 1300° F. to about 1500° F.;
the contacting the light naphtha feedstock is at a temperature in the range from about 900° F. to about 1250° F.;
the contacting the heavy naphtha feedstock is at a temperature in the range from about 850° F. to about 1200° F.;
the overhead product stream is at a temperature in the range from about 700° F. to about 1150° F.

12. The process of claim 10, further comprising recovering a bottoms product from the reactor comprising the second particulate catalyst.

13. The process of claim 10, further comprising:
feeding a hydrocarbon feedstock and a mixture of first particulate catalyst and second particulate catalyst to a second reactor;
contacting the mixture of first and second particulate catalysts with the hydrocarbon feedstock to crack the hydrocarbon feedstock and form a second reactor effluent comprising lighter hydrocarbons and a mixture of first and second particulate catalysts;
feeding both of the first stream and the second reactor effluent to a separator;
separating the first and second particulate catalysts from the lighter hydrocarbons and the converted hydrocarbon effluent to recover a hydrocarbon product and form a mixed catalyst comprising entrained hydrocarbons.

14. The process of claim 13, wherein the second reactor is a riser reactor.

15. The process of claim 13, further comprising stripping the entrained hydrocarbons from the mixed catalyst and feeding the stripped particulate catalyst to a catalyst regenerator.

16. The process of claim 15, further comprising regenerating the first and second particulate catalysts in the regenerator.

17. The process of claim 16, wherein the catalyst stream fed to the reactor comprises regenerated first and second particulate catalysts from the regenerator.

18. The process of claim 15, further comprising:
feeding fresh second particulate catalyst to the reactor;
feeding fresh first particulate catalyst to the regenerator.

19. The process of claim 13, further comprising feeding a mixture of first particulate catalyst and second particulate catalyst from the regenerator to the second reactor as the mixture of first and second particulate catalyst fed to the second reactor.

20. The process of claim 10, wherein the second particulate catalyst comprises ZSM-5 or ZSM-11, and wherein the first particulate catalyst comprises a Y-type cracking catalyst or an FCC cracking catalyst.

21. The process of claim 10, further comprising:
separating the hydrocarbon products into two or more hydrocarbon fractions including a light naphtha fraction and a heavy naphtha fraction; and
feeding the light naphtha fraction and the heavy naphtha fraction to the reactor.

22. A system for cracking hydrocarbons, comprising:
a mixing zone comprising:
a first inlet configured to receive a catalyst mixture comprising a first particulate catalyst and a second particulate catalyst at a first elevated temperature;
a second inlet configured to receive a catalyst stream comprising second particulate catalyst at a second lower temperature; and
an outlet configured to supply an admixture of the catalysts in the catalyst mixture and the catalyst stream to provide a mixed catalyst having a uniform intermediate temperature;
a reaction zone configured to:
contact the catalyst mixture having a uniform intermediate temperature with a light naphtha feed to produce a hydrocarbon-catalyst mixture at a second intermediate temperature;
contact the hydrocarbon-catalyst mixture at a second intermediate temperature with a light naphtha feed to produce a reactor effluent comprising first particulate catalyst, second particulate catalyst, and hydrocarbons;

a particle separator for separating second particulate catalyst from the reactor effluent to recover a hydrocarbon effluent stream comprising hydrocarbons and the first particles and the catalyst stream comprising second particulate catalyst, a feed line for returning separated second particles from the particle separator to the mixing zone.

23. The system of claim 22, further comprising:

a riser reactor for contacting a mixture of the first and the second particulate catalysts with a second hydrocarbon feedstock to convert at least a portion of the second hydrocarbon feedstock to lighter hydrocarbons and to recover a riser reactor effluent comprising the lighter hydrocarbons and the mixture of the first and second particulate catalysts;

a separation system receiving the hydrocarbon effluent stream and the riser reactor effluent stream, the separation system separating the hydrocarbons contained therein from the first and second particulate catalysts; and a regenerator for regenerating first and second particulate catalyst recovered in the separation system.

24. The system of claim 22, further comprising:

a stripper disposed intermediate the separation system and the regenerator for stripping additional hydrocarbons from the separated particulate catalysts and for feeding the stripped particulate catalysts to the regenerator.

25. The system of claim 22, further comprising a second separation system for separating a hydrocarbon product stream recovered from the second separator into two or more hydrocarbon fractions including the light naphtha fraction and the heavy naphtha fraction.

26. The system of claim 23, further comprising:

a first feed line for feeding fresh second particulate catalyst to the reactor;

a second feed line for feeding fresh first particulate catalyst to the regenerator.

* * * * *